United States Patent [19]
Erbes et al.

[11] Patent Number: 5,742,653
[45] Date of Patent: Apr. 21, 1998

[54] VERTICAL AND LATERAL RESTRAINT STABILIZER FOR CORE SHROUD OF BOILING WATER REACTOR

[75] Inventors: John Geddes Erbes, Mt. View; James Edward Charnley, Nevada City; Irvin Raymond Kobsa, San Jose, all of Calif.

[73] Assignee: General Electric Company, San Jose, Calif.

[21] Appl. No.: 488,768

[22] Filed: Jun. 8, 1995

Related U.S. Application Data

[63] Continuation-in-part of Ser. No. 383,023, Feb. 2, 1995, abandoned, which is a continuation-in-part of Ser. No. 245,947, May 19, 1994, and a continuation-in-part of Ser. No. 260,589, Jun. 16, 1994, Pat. No. 5,538,381.

[51] Int. Cl.$^6$ ................................................. G21C 19/00
[52] U.S. Cl. ....................................... 376/302; 376/285
[58] Field of Search ................................ 376/285, 287, 376/302

[56] References Cited

U.S. PATENT DOCUMENTS

| | | | |
|---|---|---|---|
| 1,366,955 | 2/1921 | Schneible | 220/4.26 |
| 1,425,712 | 8/1922 | Stockford | 208/106 |
| 3,445,971 | 5/1969 | Desmarchais et al. | 52/80 |
| 3,733,760 | 5/1973 | Koerner | 52/224 |
| 3,734,827 | 5/1973 | Schilling | 376/287 |
| 3,744,660 | 7/1973 | Gaines et al. | 220/10 |
| 3,785,924 | 1/1974 | Notari | 376/302 |
| 3,910,447 | 10/1975 | Bevilacqua | 220/3 |
| 3,963,565 | 6/1976 | Beine | 376/294 |
| 4,047,632 | 9/1977 | Schilling | 220/3 |
| 4,262,402 | 4/1981 | Cooper, Jr. et al. | 29/157.4 |
| 4,322,880 | 4/1982 | Lampe | 29/452 |
| 4,409,179 | 10/1983 | Burger | 376/302 |
| 4,818,470 | 4/1989 | Richardson et al. | 376/245 |
| 4,963,318 | 10/1990 | Johansson et al. | 376/446 |
| 5,392,322 | 2/1995 | Whitling et al. | 376/260 |
| 5,402,570 | 4/1995 | Weems et al. | 29/890.031 |
| 5,406,600 | 4/1995 | Jones et al. | 376/272 |
| 5,502,754 | 3/1996 | Erbes | 376/302 |

FOREIGN PATENT DOCUMENTS

| | | |
|---|---|---|
| 2051780 | 4/1971 | France . |
| 2024630 | 1/1971 | Germany . |
| 2361416 | 4/1975 | Germany . |
| 1271594 | 4/1972 | United Kingdom . |
| 94/03903 | 2/1994 | WIPO . |

OTHER PUBLICATIONS

Big Rock Point Nuclear Plant Thermal Shield Instability: Part I, Redesign and Test Programs, J.E. Corr, APED–5178, Class II, May 1966.

(List continued on next page.)

*Primary Examiner*—Daniel D. Wasil
*Attorney, Agent, or Firm*—James E. McGinness

[57] ABSTRACT

An apparatus for stabilizing a shroud against vertical and lateral deflection. The apparatus forms a vertical load path by which the shroud flange can be anchored to the shroud support plate. In the tensioned state, an upper support assembly exerts a restraining force on the top surface of the shroud flange which opposes separation of the shroud at any assumed failed circumferential weld location. The apparatus further incorporates upper and lower restraint springs which oppose lateral deflection at the elevation of the top guide support ring and at the elevation of the core plate support ring respectively. The vertical restraint assembly is made of material having a coefficient of thermal expansion which is less than a coefficient of thermal expansion of the shroud material. A desired differential thermal expansion of the vertical restraint assembly and the shroud can be attained by the selection of member lengths and materials having appropriate coefficients of thermal expansion. In particular, the vertical restraint assembly undergoes a thermal expansion which is less than the thermal expansion of the shroud when the reactor changes from a shutdown state to a fully operative state in which nuclear heat is generated, thereby producing a thermal load. The thermal load during normal operation for a shroud with the limiting combination of cracked welds should be designed to provide a net downward load on the shroud.

16 Claims, 11 Drawing Sheets

OTHER PUBLICATIONS

Big Rock Point Nuclear Plant Thermal Shield Instability: Part 2, Analysis, J.E. Corr, NEDO-13010, 69 NED-33, Class I, Nov. 1969.

Report of Operation of Big Rock Point Nuclear Plant, License No. DPR-6, Docket No. 50-155, Consumers Power Co., (1964).

Yankee Atomic Electric Company, Proposed Change No. 70, Letter to U.S. Atomic Energy Commission, Oct. 15, 1965.

U.S. Atomic Energy Commission, Safety Evaluation of Proposed Change No. 70, Oct. 28, 1965.

Yankee Atomic Electric Company, Proposed Change No. 68, Letter to U.S. Atomic Energy Commission, Oct. 15, 1965.

U.S. Atomic Energy Commission, Safety Evaluation of Proposed Change No. 68, Oct. 28, 1965.

"Applicability of Pipelocks as a Remedy for IGSCC in BWRs", Abel et al., Int. J. Pres. Ves. & Piping, 25, pp. 25–46 (1986).

BWR Owner's Group, BWROG-91028, Apr. 1991, Recommendations on Inservice Inspection of BWR Internal Components & Attachments.

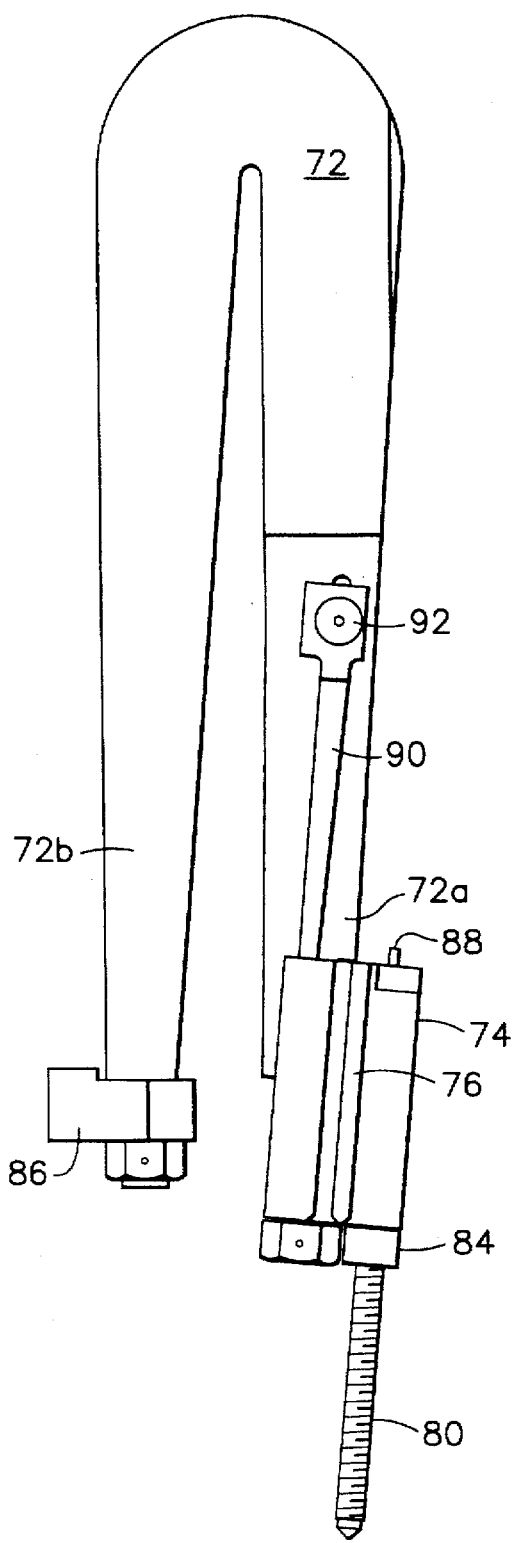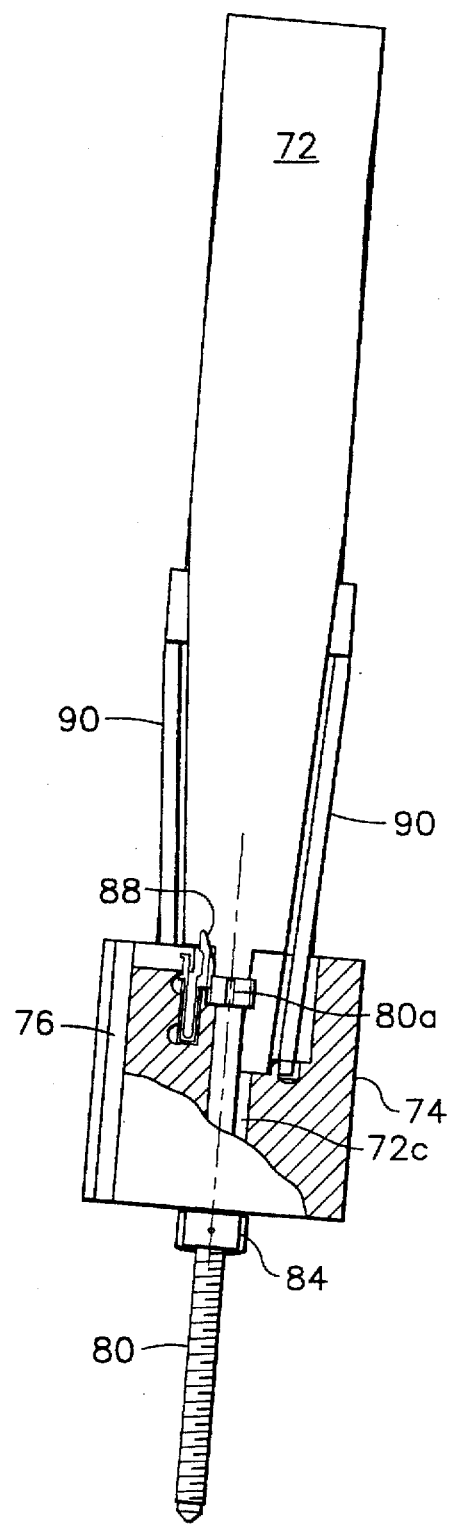
FIG. 6A
FIG. 6B

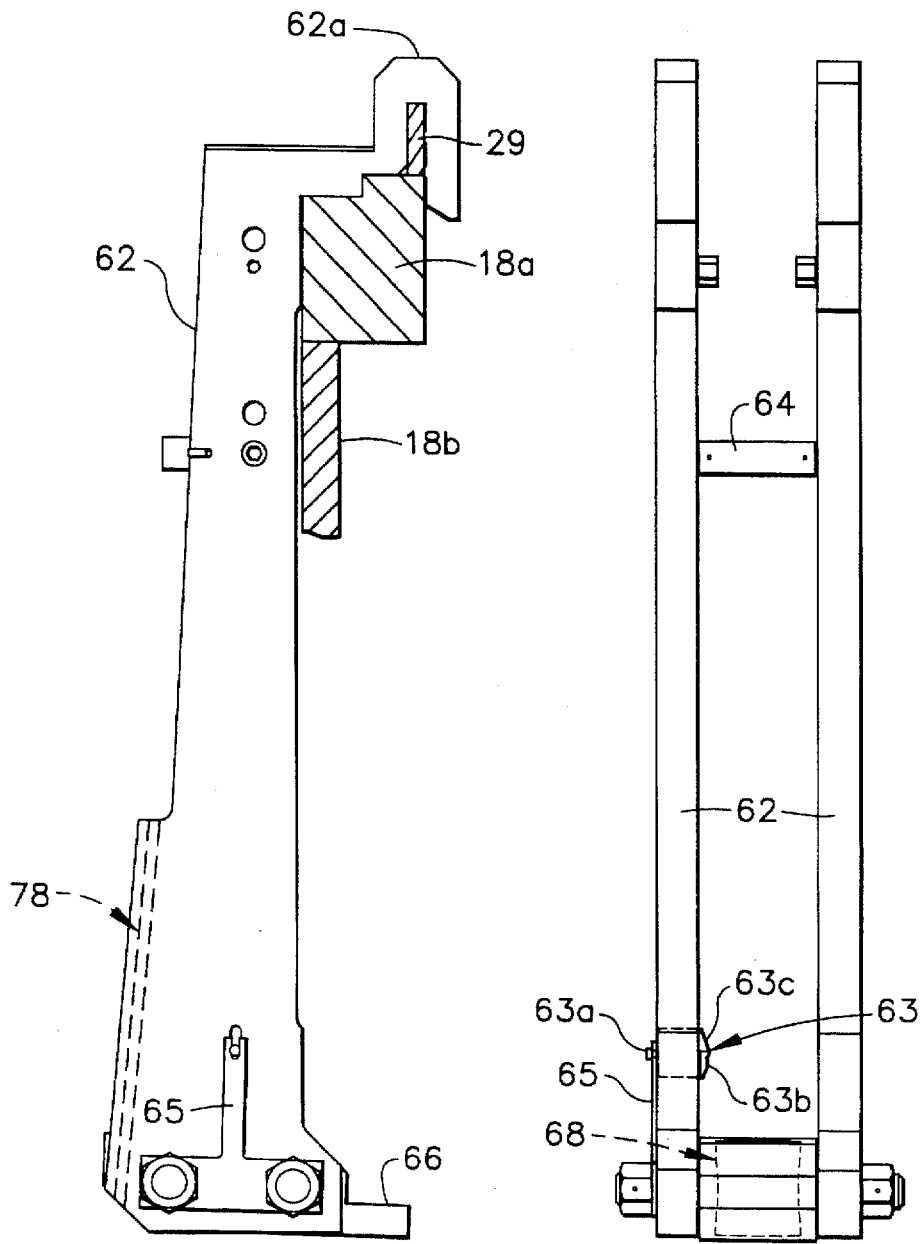
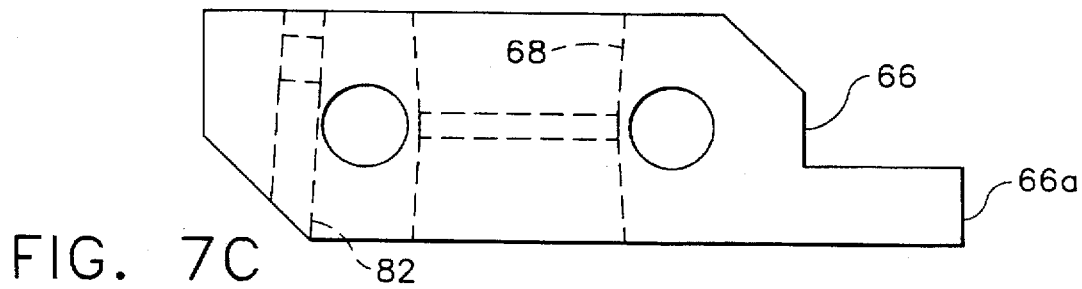
FIG. 7A  FIG. 7B
FIG. 7C

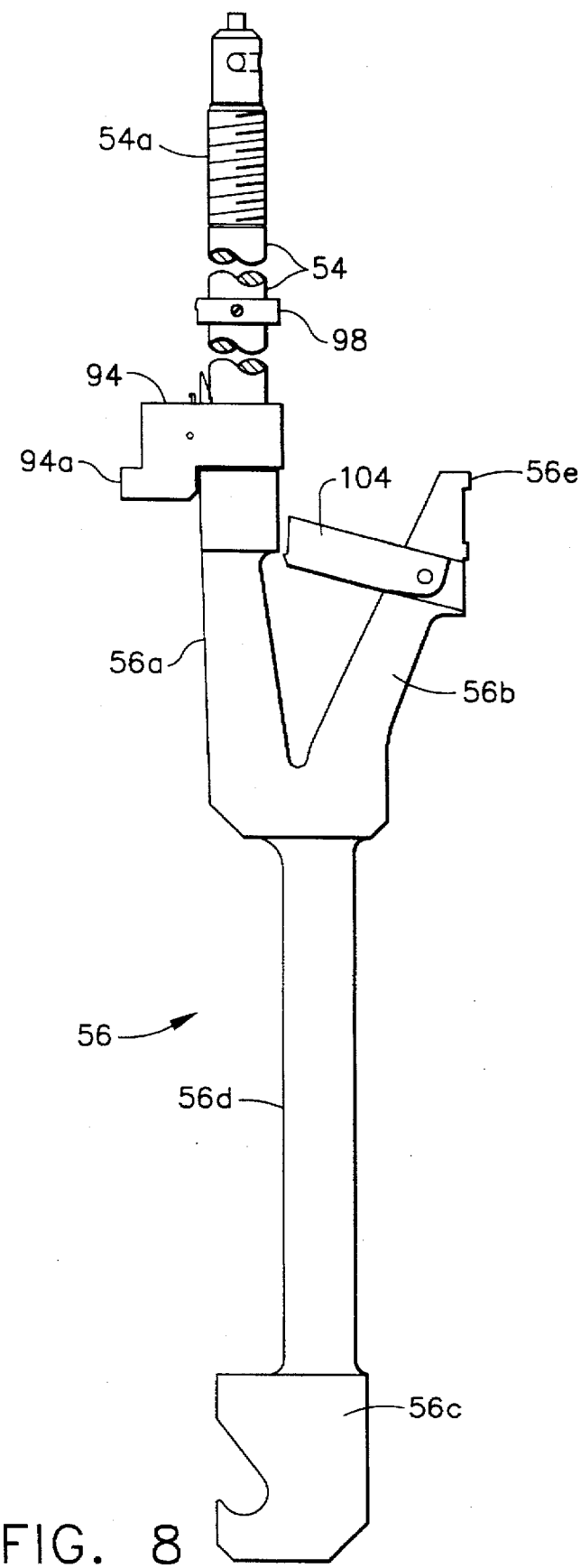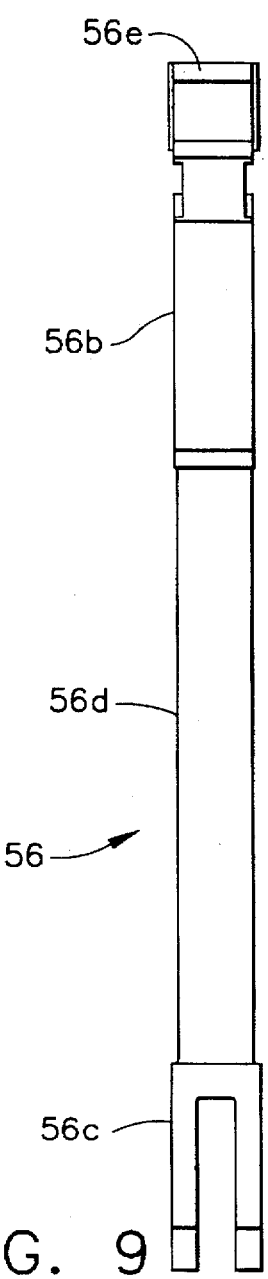
FIG. 8
FIG. 9

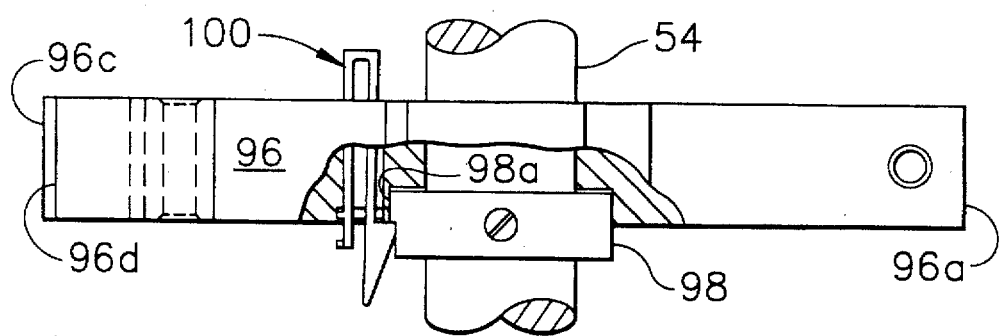
FIG. 10
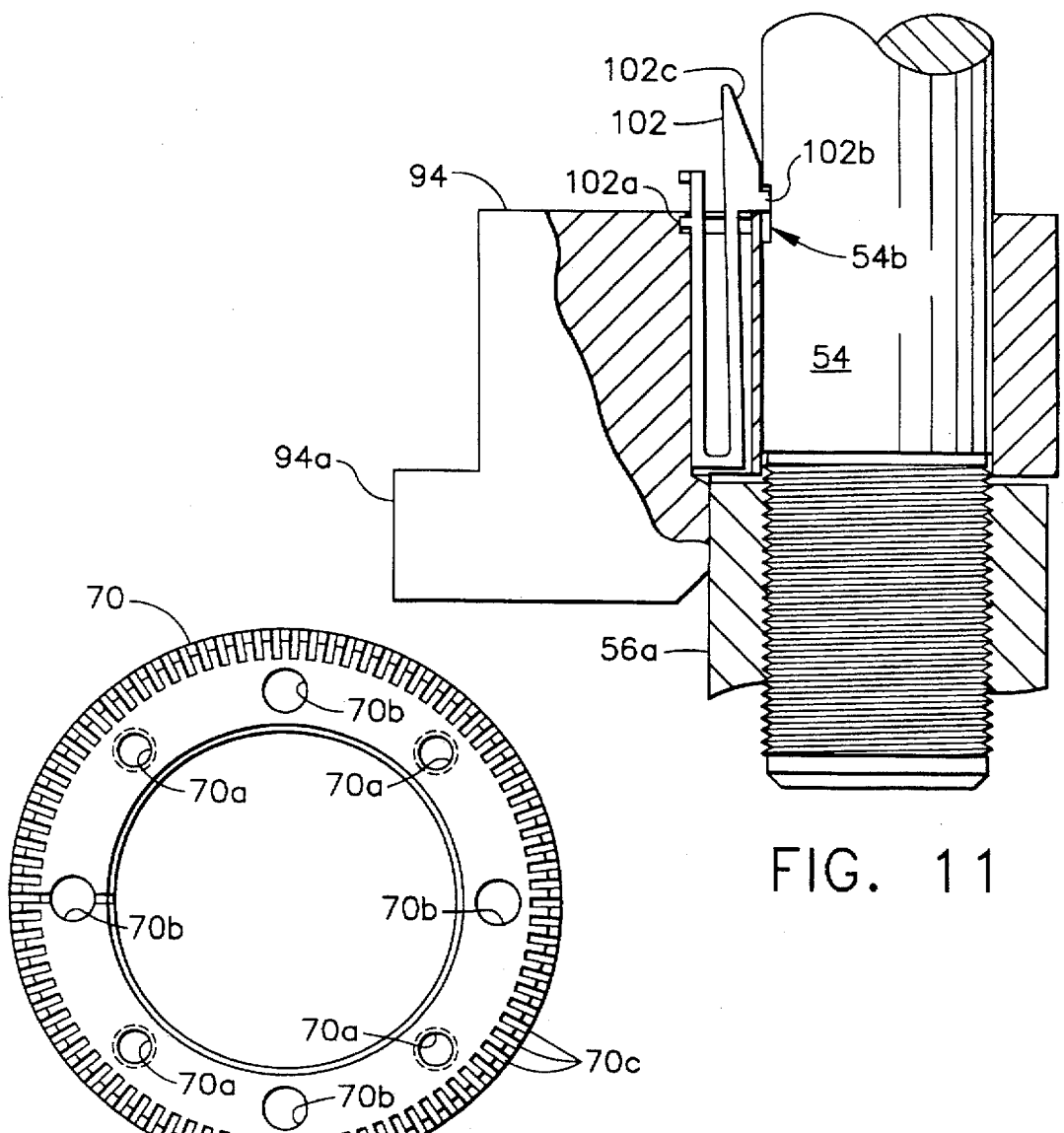
FIG. 11
FIG. 12

VERTICAL AND LATERAL RESTRAINT STABILIZER FOR CORE SHROUD OF BOILING WATER REACTOR

RELATED PATENT APPLICATIONS

This application is a continuation-in-part application of U.S. patent application Ser. No. 08/383,023 filed on Feb. 2, 1995, which in turn is a continuation-in-part application of U.S. patent application Ser. No. 08/245,947 filed on May 19, 1994 and U.S. Pat. application Ser. No. 08/260,589 filed on Jun. 16, 1994, now U.S. Pat. No. 5,538,381.

FIELD OF THE INVENTION

This invention relates to the design of nuclear reactors able to safely withstand the loads and motions produced during accident conditions. In particular, the invention relates to techniques for stabilizing the core shroud of a nuclear reactor to resist deflection in response to a seismic event and/or loss-of-coolant accident (LOCA).

BACKGROUND OF THE INVENTION

A conventional boiling water reactor is shown in FIG. 1. Feedwater is admitted into a reactor pressure vessel (RPV) 10 via a feedwater inlet 12 and a feedwater sparger 14, which is a ring-shaped pipe having suitable apertures for circumferentially distributing the feedwater inside the RPV. The feedwater from sparger 14 flows downwardly through the downcomer annulus 16, which is an annular region between RPV 10 and core shroud 18.

Core shroud 18 is a stainless steel cylinder surrounding the nuclear fuel core 20. Core 20 is made up of a plurality of fuel bundle assemblies 22 (only two 2×2 arrays of which are shown in FIG. 1). Each array of fuel bundle assemblies is supported at the top by a top guide 19 and at the bottom by a core plate 21. The core top guide provides lateral support for the top of the fuel assemblies and maintains the correct fuel channel spacing to permit control rod insertion.

The water flows through downcomer annulus 16 to the core lower plenum 24. The water subsequently enters the fuel assemblies 22, wherein a boiling boundary layer is established. A mixture of water and steam enters core upper plenum 26 under shroud head 28. Vertical standpipes 30 atop shroud head 28 are in fluid communication with core upper plenum 26. The steam-water mixture flows through standpipes 30 and enters steam separators 32, which are of the axial-flow centrifugal type. The separated liquid water then mixes with feedwater in the mixing plenum 33, which mixture then returns to the core via the downcomer annulus. The steam passes through steam dryers 34 and enters steam dome 36. The steam is conducted from the RPV via steam outlet 38.

The BWR also includes a coolant recirculation system which provides the forced convection flow through the core necessary to attain the required power density. A portion of the water is sucked from the lower end of the downcomer annulus 16 via recirculation water outlet 43 and forced by a centrifugal recirculation pump (not shown) into jet pump assemblies 42 (only one of which is shown) via recirculation water inlets 45. The BWR has two recirculation pumps, each of which provides the driving flow for a plurality of jet pump assemblies. The jet pump assemblies are circumferentially distributed around the core shroud 18.

The core shroud 18 (see FIG. 2) comprises a shroud flange 18a for supporting the shroud head 28; a circular cylindrical upper shroud wall 18b having a top end welded to shroud flange 18a; an annular top guide support ring 18c welded to the bottom end of upper shroud wall 18b; a circular cylindrical middle shroud wall comprising three sections 18d, 18e and 18f welded in series, with a top end of section 18d being welded to top guide support ring 18c; and an annular core plate support ring 18g welded to the bottom end of middle shroud wall section 18f and to the top end of a lower shroud wall 18h. The entire shroud is supported by a shroud support 50, which is welded to the bottom of lower shroud wall 18h, and by annular shroud support plate 52, which is welded at its inner diameter to shroud support 50 and at its outer diameter to RPV 10.

In the event of a seismic disturbance, it is conceivable that the ground motion will be translated into lateral deflection relative to the reactor pressure vessel of those portions of the shroud located at elevations above shroud support plate 52. Such deflections would normally be limited by acceptably low stresses on the shroud and its weldments. However, if the shroud weld zones have failed due to stress corrosion cracking, there is the risk of misalignment and damage to the core and the control rod components, which would adversely affect control rod insertion and safe shutdown.

Stress corrosion cracking in the heat affected zone of any shroud girth seam welds diminishes the structural integrity of shroud 18, which vertically and horizontally supports core top guide 19 and shroud head 28. In particular, a cracked shroud increases the risks posed by a loss-of-coolant accident (LOCA). During a LOCA, the loss of coolant from the reactor pressure vessel produces a loss of pressure above the shroud head 28 and an increase in pressure inside the shroud, i.e., underneath the shroud head. The result is an increased lifting force on the shroud head and on the upper portions of the shroud to which the shroud head is bolted. If the core shroud has fully cracked girth welds, the lifting forces produced during a LOCA could cause the shroud to separate along the areas of cracking, producing undesirable leaking of reactor coolant. Thus, there is a need to stabilize a core shroud which has been weakened by SCC to prevent shroud separation as pressure builds in response to a LOCA.

SUMMARY OF THE INVENTION

The present invention is an apparatus for restraining a cracked shroud against vertical and lateral deflection. This repair integrates the required vertical and lateral support features in a combined assembly. Typically, three to eight such assemblies are required, preferably distributed at about equal angular intervals around the shroud periphery and installed between jet pump assemblies. The combination of vertical and lateral support in a single assembly provides a reduction in installed hardware and in the number of installation, machining and assembly operations. This correspondingly minimizes the extension of reactor outages needed to perform shroud repair.

In accordance with one aspect of the invention, the apparatus restrains a cracked shroud against vertical joint separation by applying a thermal load which is the result of differential thermal expansion of the vertical restraint apparatus and the shroud. A desired differential thermal expansion can be attained by the selection of materials having appropriate coefficients of thermal expansion. For example, a typical shroud is made of Type 304 stainless steel having a coefficient of thermal expansion $\alpha_{304SS} = 9.4244 \times 10^{-6}$ inch/inch/°F. In contrast, the vertical restraint assembly in accordance with a preferred embodiment of the invention comprises a tie rod made of XM-19 stainless steel, having a coefficient of thermal expansion $\alpha_{XM-19} = 8.9464 \times 10^{-6}$ inch/ inch/°F., and an upper support and a lower spring both made of Inconel Alloy X-750, having a coefficient of thermal expansion $\alpha_{X-750}=7.50\times 10^{-6}$ inch/inch/°F. By proper structural design of the foregoing components, a differential thermal expansion, corresponding to a desired thermal load to be applied to the shroud by the vertical restraint apparatus, can be achieved. The thermal load must be sufficient to counteract the lifting forces exerted on a cracked shroud by the top guide, core plate and bolts which hold down the shroud head during normal operation and upset conditions.

The repair method of the invention involves the placement of a plurality of tie rods (e.g., four) in the downcomer annulus at respective azimuthal positions, each of the tie rods having one end anchored to the shroud support plate. A reactor can be retrofitted in accordance with the method of the present invention by machining holes in the shroud support plate or in a plurality of existing gusset plates welded thereto, depending on the original shroud support design. The lower end of each tie rod is then anchored to the shroud support plate by means of a coupling with a corresponding hole. The upper tie rod support is latched over the top edge of the shroud to counteract lifting forces exerted on the shroud by the top guide, core plate and bolts which hold down the shroud head. To accommodate the upper support, notches are machined in the shroud head ring of the shroud head at positions aligned with the tie rod locations. Alternatively, notches are machined in the shroud flange. Each notch at a respective azimuthal position allows space for an upper support bracket. The upper end of the tie rod is coupled to the upper support bracket assembly by a threaded tensioning nut.

The upper support bracket assembly incorporates a hooking means which seats on the shroud flange. A tension is applied to the hooking means by tightening the tensioning nut on a threaded upper portion of the tie rod. As the nut travels down the tie rod, it tensions the upper support bracket assembly so that the hooking means holds the shroud flange in a fixed vertical position relative to the shroud support plate, to which the tie rod is anchored.

The amount of tension applied to the hooking means via mechanical tensioning of the nut on the tie rod is sufficient to prevent looseness and vibratory wear. Use of relatively low tensile load avoids inducing significant additional stress at locations of weld discontinuities in the shroud, which could accelerate cracking. Significant loads are applied to the tie rods only in the event of a LOCA or seismic event under shroud conditions where one or more shroud girth welds are fully cracked. In particular, the tie rod assemblies limit separation of a shroud along cracks in the girth welds or heat affected zones thereof in response to lifting pressure on the shroud head.

In accordance with a further aspect of the invention, upper and lower stabilizers are coupled to the tie rod assembly to restrain the shroud against lateral deflection relative to the reactor pressure vessel. The upper stabilizer is mounted on the upper support bracket assembly; the lower stabilizer is integrated with the tie rod assembly. Preferably, the upper stabilizers are installed near the elevation of the top guide support ring, while the lower stabilizers are installed near the elevation of the core plate support ring.

Each stabilizer is a double cantilever "wishbone" spring resiliently wedged between the shroud and RPV. The springs exert radially inwardly directed forces that resist lateral deflection of the shroud relative to the RPV. In addition, the double cantilever wishbone spring mounting adjusts to varying width of the downcomer annulus. The width can vary due to manufacturing tolerances, and due to differential expansion and pressure dilation of the stainless steel shroud versus the low-alloy steel reactor pressure vessel under operating conditions. Each double cantilever wishbone spring is slidably wedged into place and then latched to respective supporting structure to prevent vibration-induced uncoupling.

In accordance with another feature of the invention, the lower stabilizer spring provides axial flexibility to minimize both axial tie rod loads and lateral restraint spring loads. This is accomplished by provision of an offset connecting member between the wishbone radial spring and the clevis hook pin center. Adjustable axial flexibility is obtained by bending of the connecting member due to the offset between its axis and the tie rod/clevis load path.

Another improvement provided by the invention is the elimination of all welding from both construction and assembly. This is beneficial in avoiding residual stress and heat affected zone effects which can contribute to stress corrosion cracking.

While all parts are installed with some initial load to resist failure due to vibratory excitation, the required restraint of the shroud motion is achieved with minimal additional loads under normal operation.

Finally, a middle support may be attached to a mid-portion of the tie rod. The middle support is preloaded against the reactor pressure vessel at assembly by radial interference, the preload being sufficient to bend the tie rod. This provides mid-span support for the tie rod, thereby improving its resistance to failure due to vibratory excitation. The middle support also provides a lateral motion stop for the shroud central shell, in the event of complete failure of its girth welds.

BRIEF DESCRIPTION OF THE DRAWINGS

FIGS. 6A and 6B are side and rear elevation views respectively of the upper stabilizer assembly in accordance with the preferred embodiment of the invention.

FIGS. 7A and 7B are side and rear elevation views respectively of the upper support assembly in accordance with the preferred embodiment of the invention.

FIG. 7C is a side elevation view of the support block incorporated in the upper support assembly shown in FIGS. 7A and 7B.

FIG. 8 is a side elevation view of the tie rod/lower spring assembly in accordance with the preferred embodiment of the invention.

FIG. 9 is a rear elevation view of the lower spring in accordance with the preferred embodiment.

FIG. 10 is a side elevation view of the mid-support assembly in accordance with the preferred embodiment.

FIG. 11 is a side elevation view of the lower stabilizer vessel contact spacer in accordance with the preferred embodiment of the invention.

FIG. 12 is a plan view of the tie rod nut in accordance with the preferred embodiment.

DETAILED DESCRIPTION OF THE PREFERRED EMBODIMENTS

Figure 1:
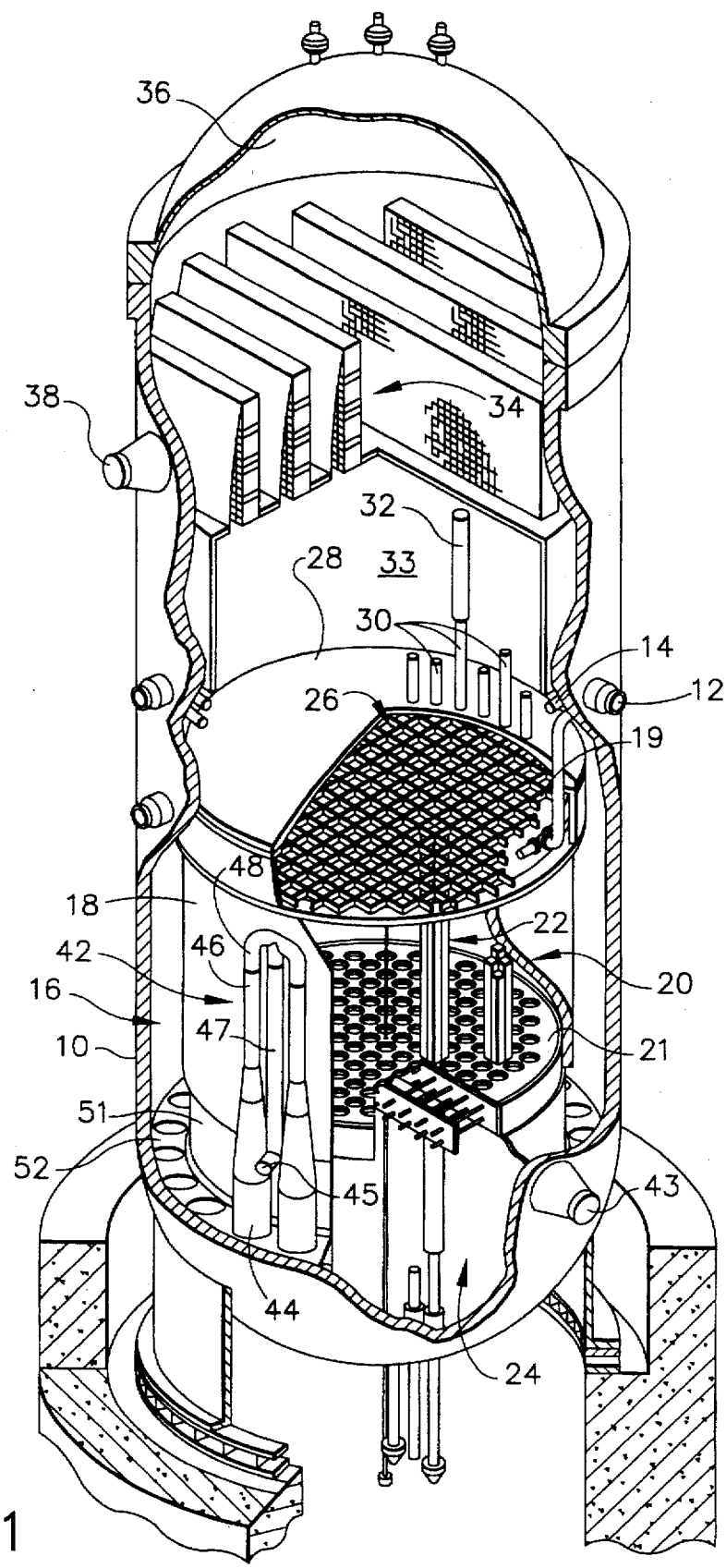
FIG. 1 is a schematic showing a partially cutaway perspective view of a conventional BWR.
Figure 2:
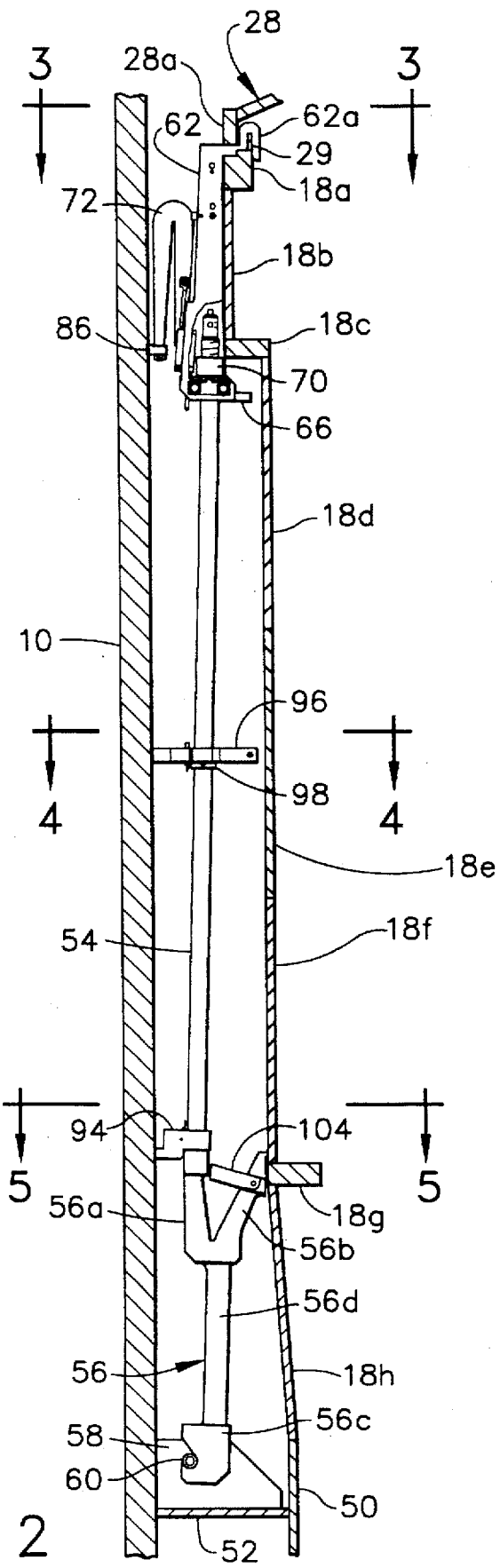
FIG. 2 is an elevation view of a repaired core shroud in accordance with a preferred embodiment of the invention.

Referring to FIG. 2, a shroud restraint tie rod assembly in accordance with a preferred embodiment of the invention comprises a tie rod 54 having a circular cross section. A lower end of tie rod 54 is anchored in a threaded bore formed in the end of a spring arm 56a of a lower spring 56. Tie rod 54 extends from the end of spring arm 56a to a position adjacent the outer circumferential surface of the top guide support ring 18c. The upper end of tie rod 54 has a threaded portion.

The lower spring 56 is anchored to a gusset plate 58 attached to the shroud support plate 52. The gusset is part of the original construction in some reactors, or is otherwise bolted in place as part of the repair. Alternatively, a hole can be machined in the shroud support plate for receiving four resilient fingers formed on the end of the lower spring and having latching projections formed thereon.

In accordance with the preferred embodiment of the present invention, the lower spring 56 has a slotted end (see FIG. 9) which straddles gusset plate 58 and forms a clevis hook 56c. The clevis hooks under opposite ends of a clevis pin 60 inserted through a hole machined in the gusset plate 58. Engagement of the slotted end with the gusset plate 58 maintains alignment of lower spring 56 under the action of seismic motion of the shroud, which may be oblique to the spring's radial orientation.

Figure 3:
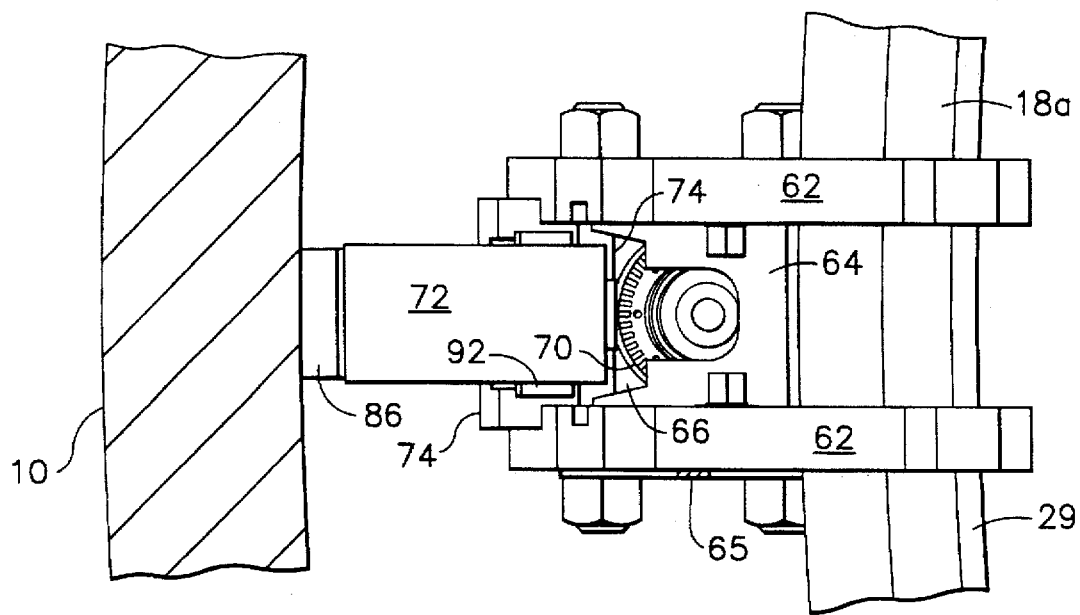
FIGS. 3, 4 and 5 are plan views respectively taken along section lines 3—3, 4—4 and 5—5 seen in FIG. 2.

The tie rod 54 is supported at its top end by an upper support assembly which hangs from the top edge of the shroud. In accordance with the installation method of the present invention, a pair of notches or slots are machined in the shroud head ring 28a of shroud head 28. The notches are positioned in alignment with a pair of bolted upper support plate segments 62 (see FIG. 3) of the upper support assembly when the shroud head 28 is properly seated on the top surface of shroud flange 18a. These notches facilitate the coupling of the tie rod assembly to the shroud flange in accordance with the invention, as described in detail hereinafter. The preferred machining technique is electrical discharge machining, although any other suitable machining technique can be used.

Figure 13:
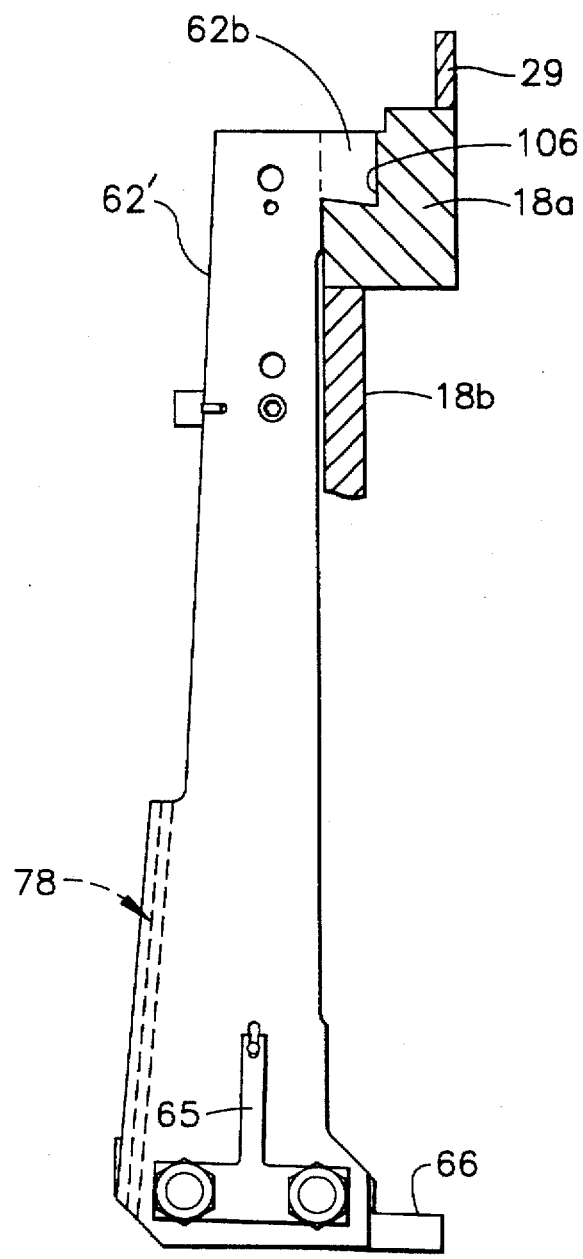
FIG. 13 is a side elevation view of the upper support assembly in accordance with an alternative preferred embodiment of the invention.

The pair of notches at each tie rod azimuthal position receive respective hook portions 62a of the upper support plates 62. As best seen in FIG. 7A, each hook 62a conforms to the shape of the top surface of shroud flange 18a and the shape of the steam dam 29. The distal end of hook 62a hooks on the inner circumference of shroud dam 29. Alternatively, notches 106 are machined in the shroud flange 18a for receiving hook portions 62b of support plate segments 62', as seen in FIG. 13.

The upper support plates 62 are connected in parallel by a top support bracket 64 and a support block 66 which forms the anchor point for the top of the tie rod. Support block 66 has an unthreaded bore 68, tapered at both ends, which receives the upper end of tie rod 54. After the upper end of tie rod 54 is passed through bore 68, a threaded ring nut 70 is screwed onto the threaded portion 54a of tie rod 54. As shown in FIG. 12, the preferred embodiment of the tensioning nut 70 has four threaded axial holes 70a circumferentially distributed at equiangular intervals on the top surface thereof. A remotely manipulated installation tool (not shown) is coupled to the tensioning nut 70 by means of a corresponding plurality of bolts which are screwed into holes 70a. The nut 70 further has four unthreaded axial holes 70b circumferentially distributed at equiangular intervals on the top surface thereof for engagement with mating shear pins of the installation tool. The peripheral edge of the top surface of nut 70 has a multiplicity (e.g., 90) of radial slots 70c spaced at equiangular intervals (e.g., 4°).

Referring to FIG. 7B, one of upper support plates 62 has an aperture in which a retainer 63 is slidably seated. One end of retainer 63 has a slotted projection 63a to which the end of a T-shaped spring 65 (best seen in FIG. 7A) is attached. The other end of retainer 63 has a key 63b which fits into any one of the radial slots 70c. The spring 65 preloads the retainer from left to right in FIG. 7B. At its limit position, key 63b extends into one of the radial slots 70c, thereby preventing rotation of nut 70, e.g., due to flow-induced vibrations inside the reactor.

The other end of retainer 63 is further provided with an oblique surface 63c disposed above the key 63b. When the tensioning nut/installation tool assembly are screwed onto the tie rod, the lower edge of the nut 70 will contact oblique surface 63c. As the nut/tool assembly moves down the tie rod, the nut acting on the oblique surface 63c will overcome the resistance of spring 65 and cam the key 63b so that it does not interfere with rotational engagement of nut 70. As the nut is tightened, it bears against support block 66 and tensions the upper support and tie rod assembly with a desired load. At that point the nut is tightened incrementally until the next radial slot opposes the retainer 63. Then the installation tool is disengaged from the nut, which allows spring 65 to preload retainer 63 forward until key 63c protrudes into the opposing radial slot 70c, thereby locking the tie rod nut 70 against rotation.

The assembly comprised of support plates 62 with hooks 62a, support block 66, tie rod 54, lower spring 56, clevis pin 60 and gusset plate 58 form a vertical load path by which the shroud flange 18a is connected to the shroud support plate 52. In the tensioned state, upper support plates 62 exert a restraining force on the top surface of the shroud flange 18a which opposes separation of the shroud at any assumed failed circumferential weld location.

Referring to FIGS. 6A and 6B, the upper restraint spring 72 is a double cantilever "wishbone" design, to react the lateral seismic loads without adding bending load on the top support. The end of one arm 72a of spring 72 has an axle mounting 72c which is rotatably mounted in an unthreaded bore formed in an upper spring bracket 74. This allows the spring to rotate relative to the upper spring bracket 74. The end of the other arm 72b has an upper contact spacer 86 rotatably mounted thereon. Upper contact spacer 86 is designed to bear against the inner surface of the reactor pressure vessel wall.

The upper spring bracket 74 has a pair of parallel linear projections 76 which slide in corresponding grooves 78, formed on opposing surfaces of upper support plates 62, during installation of the upper spring assembly. The grooves 78 are oriented at an acute angle (e.g., 5°) relative to the vertical axis of the vessel inside surface. In addition, the upper spring assembly comprises a jack bolt 80 which passes through an unthreaded bore in the upper spring bracket 74. Longitudinal displacement of jack bolt 80 relative to upper spring bracket 74 is prevented by a shoulder under the head of jack bolt 80 and by a jack bolt sleeve 84, while allowing jack bolt 80 to rotate freely relative to upper spring bracket 74. A threaded end of jack bolt 80 projects beyond the upper spring bracket and is screwed into a threaded bore 82 (see FIG. 7C) in the support block 66. The threaded bore 82 is disposed parallel to grooves 78 in the upper support plates 62. Thus, as the jack bolt is rotated, the upper spring bracket 74 and upper spring 72 coupled thereto translate in parallel with grooves 78 until the upper contact spacer 86 on arm 72b is wedged against the inner surface of the reactor pressure vessel wall. The upper spring assembly is installed with enough elastic preload to prevent mechanical wear of its parts due to reactor vibration.

In accordance with the invention, the upper spring 72 is installed with a desired preload against the wall of vessel 10, the amount of preload being a function of the distance which jack bolt 80 travels along bore 82 in support block 66. This mounting allows simple installation and subsequent removal, if required for reactor servicing access.

When the desired amount of preload has been attained, the jack bolt is locked against further rotation relative to upper spring bracket 74 by engagement of a pair of wishbone latches 88. The spring latch 88 has a short leg with a projection that interlocks with the upper spring bracket 74 and a long leg with a key that interlocks with one of a multiplicity of longitudinal slots 80a formed on the outer circumference of the head of jack bolt 80. The tip of the long leg of spring latch 88 has a surface which is oblique relative to the leg axis. This oblique surface is contacted by a portion of a tool (not shown) which is used to screw and unscrew the jack bolt 80. The tool surface bears against the oblique surface, thereby camming the key on the long leg to a position where it will not interfere with the head of the jack bolt during its rotation.

In the event of seismic loading at some oblique angle, the spring 72 can rotate on its axle mounting 72c (see FIG. 6B) to absorb the azimuthal motion component, without transmitting oblique loading into the support block 66. Cantilever torsion arms 90 on each side of the upper spring 72 restore the rotational alignment of the spring after seismic deflection. Each torsion arm 90 has one end coupled to arm 72a at an intermediate point therealong by means of a torsion arm bolt 92. The other end of each torsion arm is coupled to upper spring bracket 74. The upper contact spacer 86 which bears against the vessel 10 reacts the restraint load from the vessel and pivots to follow the spring rotation.

Referring back to FIG. 2, the spring arm 56a of lower spring 56 laterally supports the shroud 18 at the core plate support ring 18g the vessel 10, via a lower contact spacer 94. The lower spring assembly is installed with a controlled preload, obtained by machining the contact pad 94a of spacer 94 to match the measured assembly fitup.

As seen in FIG. 11, the top end of spring arm 56a has a threaded bore to provide the attachment for the bottom of the tie rod 54. The lower contact spacer 94 is coupled to the lower end of tie rod 54 via a wishbone spring latch 102. The spring latch 102 has a short leg with a projection 102a that interlocks with the lower contact spacer 94 and a long leg with a projection 102b that interlocks with a recess 54b formed in the tie rod. Thus, spring latch 102 blocks upward vertical displacement of lower contact spacer 94 relative to tie rod 54. The tip of the long leg of spring latch 102 has an oblique surface 102c which is engaged by a tool (not shown) for inserting and removing the spring latch. As a result of this engagement, the projection 102b is cammed to a position whereat it does not interfere with the tie rod, i.e., the lower contact spacer is free to slide or rotate relative to the tie rod 54.

The member 56d connecting the upper wishbone spring 56a, 56b to the clevis hook 56c is offset from the line of action between the lower end of tie rod 54 and the clevis pin 60 to provide a vertical spring compliance in the load path to the tie rod. Axial loads in the tie rod cause bending of the lower connecting member 56d and associated pivoting of the clevis hook 56c about the clevis pin 60. The specific configuration is designed to add the desired axial flexibility to the assembly to minimize loads on the tie rod due to differential thermal expansion, which could induce stress and cracking, or due to tilting motion of the shroud from seismic loads which could overload the tie rod. This flexibility is adjusted along with that of the upper and lower lateral springs to tune the dynamic frequency response of the reactor internal structure to minimize lateral seismic loads.

The lateral seismic loads from the main mass of the reactor core are reacted (for a cracked shroud) by the upper and lower springs at the top guide 18c and core plate 18e, respectively. Gross motion limit stops are also mounted on the stabilizers to limit lateral displacement of other segments of the shroud due to circumferential weld failures. Each upper support block 66 has a limit stop 66a which blocks gross lateral deflection of the middle shroud wall 18d relative to the top guide support ring 18c in the event that the welds between top guide support ring 18c and middle shroud wall 18d become severed. If left unchecked, gross lateral deflection of middle shroud wall 18d could damage peripheral fuel assemblies in the fuel core.

Figure 4:
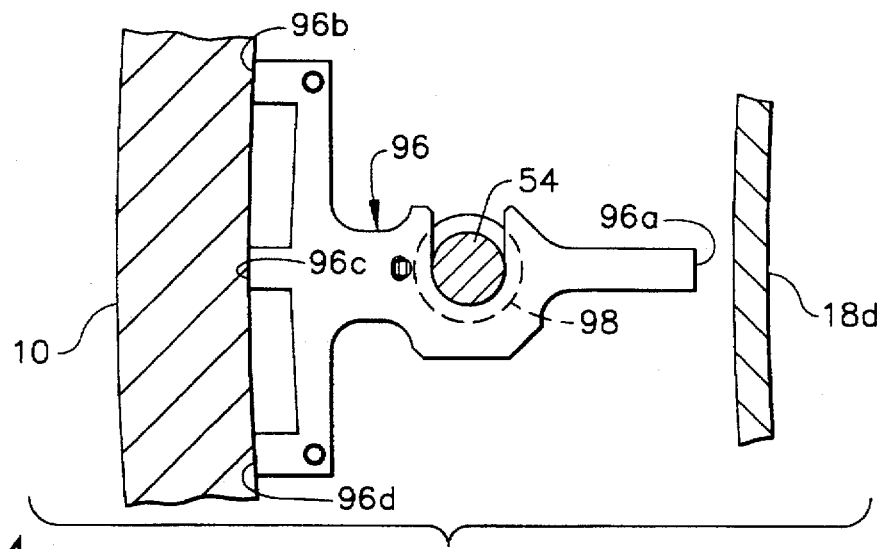
Figure 5:
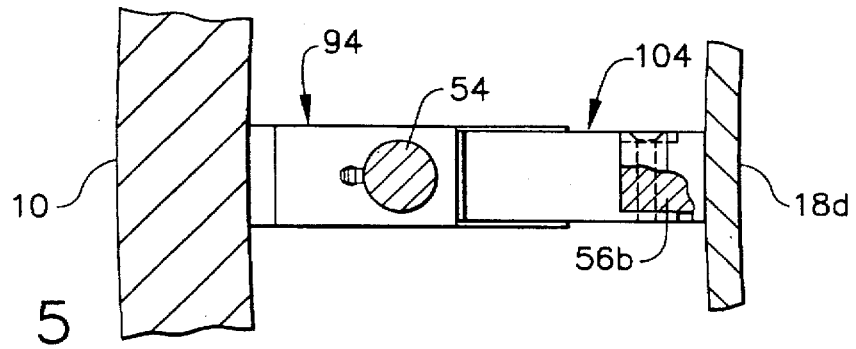

A middle support 96 may be used to provide a limit stop 96a, as shown in FIG. 4. To facilitate mounting of the middle support 96, a mid-support ring 98 is secured to the tie rod 54, as shown in FIG. 8. The middle support 96 has a section of an annular recess counterbored in its bottom which form fits on ring 98, as seen in FIG. 10, thereby preventing lateral shifting of middle support 96 relative to tie rod 54. The middle support 96 is latched to mid-support ring 98 by a wishbone spring latch 100, which blocks upward vertical displacement of middle support 96 relative to the tie rod 54. The spring latch 100 has a short leg with a projection that interlocks with the middle support 96 and a long leg with a projection 100a that latches underneath an offset 98a formed in the mid-support ring 98. Projection 100a has an oblique surface which is engaged by a tool (not shown) for inserting and removing the spring latch. As a result of this engagement, the projection 110a is cammed to a position whereat it does not interfere with the mid-support ring 98, i.e., the middle support 96 is free to be lifted off of ring 98 and removed.

The middle support 96 is preloaded against the vessel wall at assembly by radial interference which bends the tie rod 54. The contact pads 96b–96d (shown in FIG. 4) are machined to mate with the vessel wall 10 such that the desired preload is produced in the tie rod. Thus, middle support 96 provides both a limit stop for the middle shroud wall 18d, and a mid-span support for the tie rod, improving its resistance to vibratory excitation failure.

Further, each lower spring 56 has a stop 56e which blocks gross lateral deflection of the lower shroud wall 18f relative to the core plate support ring 18e in the event that the welds between core plate support ring 18e and lower shroud wall 18f become severed. Gross lateral deflection of lower shroud wall 18f could, if not checked, cause damage to the control rod guide tubes located underneath the core. Lateral displacement is limited by the radial clearance between arm projection 56e of lower spring 56 and lower shroud wall 18h, as best seen in FIG. 8. The gusset 58 limits displacement of the shroud support 50.

The limit stop 104 provides protection against permanent deformation of arms 56a and 56b in the unlikely event seismic loads exceed the plant's licensed design values. This assures safe shutdown of the plant and continued functioning of the restraints. The upper spring has a similar displacement limit built into its design, as the space between upper spring bracket 74 and upper contact spacer 86 defines the allowable amount of travel.

The above-described apparatus restrains a cracked shroud against vertical joint separation by applying a thermal load which is the result of differential thermal expansion of the vertical restraint apparatus (including the gusset) and the shroud. A desired differential thermal expansion can be attained by the selection of member lengths and materials having appropriate coefficients of thermal expansion. For example, a typical shroud is made of Type 304 stainless steel having a coefficient of thermal expansion $\alpha_{304SS}=9.4244 \times 10^{-6}$ inch/inch/°F. In contrast, the vertical restraint assembly in accordance with a preferred embodiment of the invention comprises a tie rod made of XM-19 stainless steel, having a coefficient of thermal expansion $\alpha_{XM-19}=8.9464\times10^{-6}$ inch/inch/°F., and an upper support and a lower spring both made of Inconel Alloy X-750, having a coefficient of thermal expansion $\alpha_{X-750}=7.50\times10^{-6}$ inch/inch/°F. By proper structural design of the foregoing components, a differential thermal expansion, corresponding to a desired thermal load to be applied to the shroud by the vertical restraint apparatus, can be achieved. The thermal load must be sufficient to counteract the lifting forces exerted on a cracked shroud by the top guide, core plate and bolts which hold down the shroud head during normal operation and upset conditions.

Thus, the thermal load to be applied via the tie rod assembly is a critical parameter in the shroud repair technique of the present invention. For each installation, the magnitude of the thermal load applied through differential thermal expansion will be a function of the coefficients of thermal expansion of the materials used, the respective lengths of the tie rod assembly components, the shroud and the shroud support cylinder, and the respective changes in temperature to which the foregoing structures are subjected. The thermal load and tensile stress on the tie rod can be determined in each case using structural design and analysis techniques.

Figure 14:
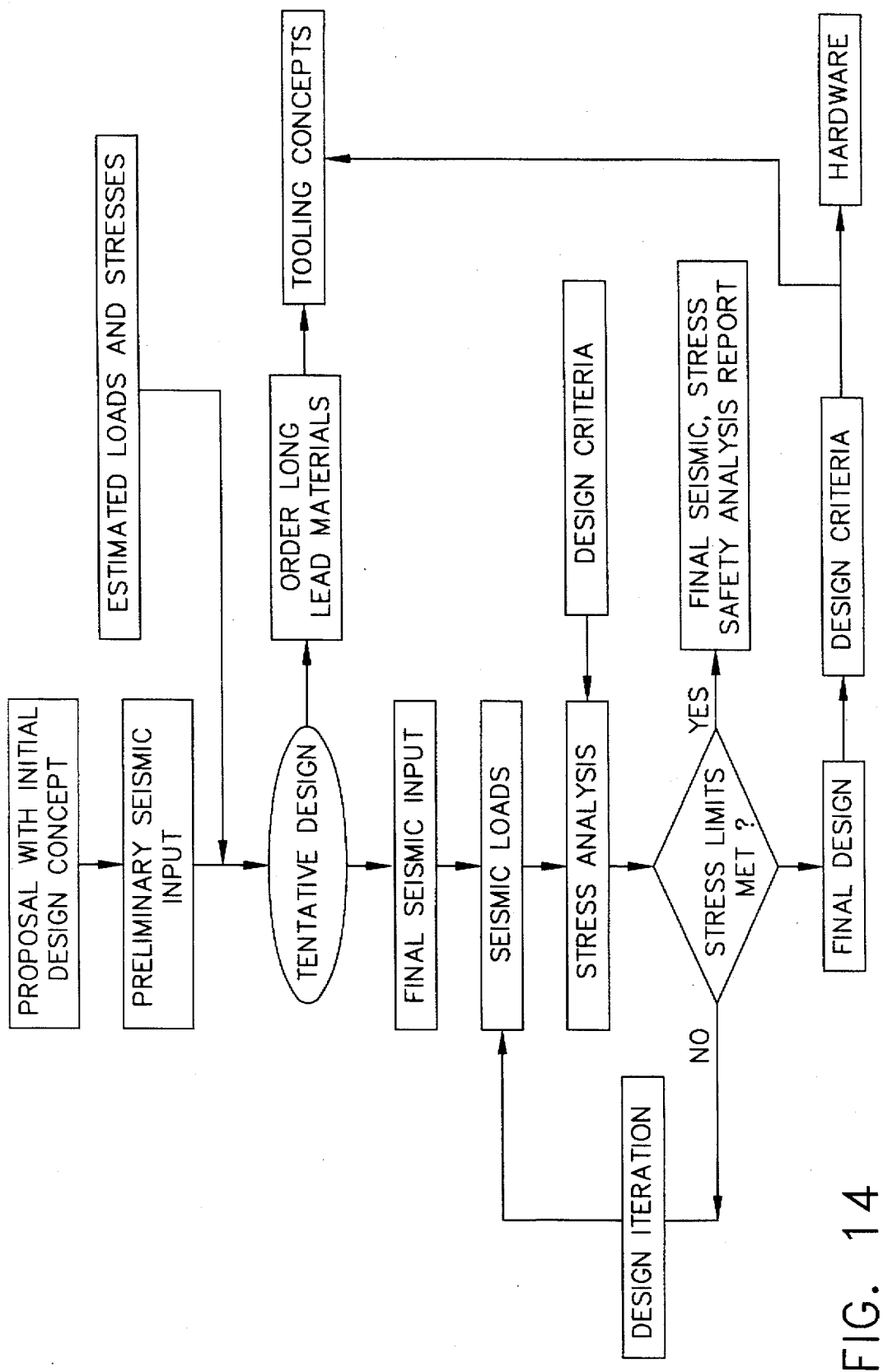
FIG. 14 is a flowchart showing the steps of the process for designing and analyzing shroud repair hardware in accordance with the present invention.

In the present application, the shroud repair design and analysis involves a complex iterative combination of design specification, mechanical design, seismic analysis, structural analysis, ASME Code design analysis, safety evaluation and installation methods and tooling design. FIG. 14 shows a flowchart describing the sequence starting from the proposal step to the final hardware fabrication. At the proposal stage, all that is known is the vessel and internals configuration and approximate seismic loading for the shroud in the uncracked condition. The initial design concept will be based on this as well as experience from other plants. There are essentially four shroud support configurations for BWRs that lead to different stabilizer attachments to the shroud support: (i) gusset supports; (ii) shrouds supported with legs that extend to the vessel; (iii) the BWR/2 design with the conical shroud attachment to the vessel and (iv) a design which has a thick low-alloy-steel shroud support plate and no support legs or gussets. For a given support type, the seismic loading is an important factor in determining the appropriate spring stiffnesses. Based on this, the initial design concept is developed. Then preliminary seismic inputs can be used to determine the resultant dynamic loads, which in turn are input into the stress analysis. With some iterations, if necessary, a tentative design can be developed. Since the seismic loads are strongly dependent on the spring stiffnesses, several iterations may be needed before the stiffness values are finalized. At the same time the design criteria document is prepared. This includes the appropriate loads, shroud delta P values, thermal events to be analyzed, load requirements and ASME code or other structural criteria for use in the stress analysis. With the design specification ready, a stress analysis can be performed to verify compliance with the design requirement. In some cases where the stress limits are not met, further iterations may be necessary before a final design that meets all the design criteria is developed. At this point the drawings, seismic, stress and safety analyses, and installation tooling design are finalized.

Figure 15:
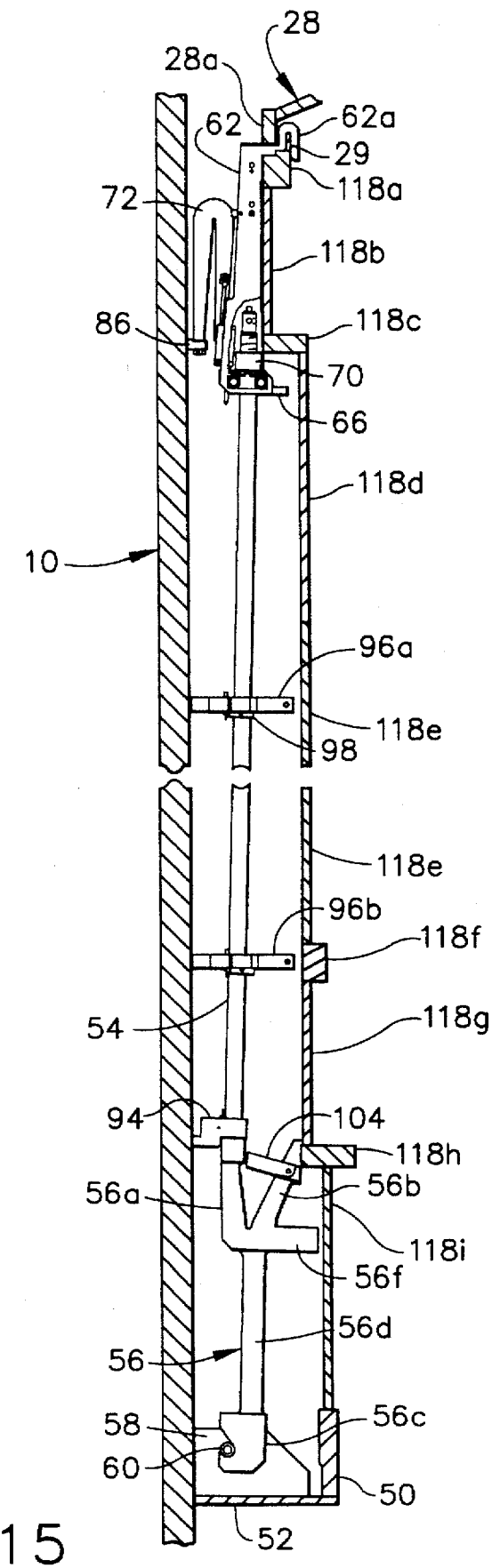
FIG. 15 is an elevation view of a repaired core shroud in accordance with another preferred embodiment of the invention.

Details of the shroud repair process are described below with reference to an actual repair installed at a nuclear power plant having the shroud design depicted in FIG. 16. Because this shroud design deviates from the shroud design depicted in FIG. 2, the shroud repair apparatus shown in FIG. 2 was modified as shown in FIG. 15. In accordance with this repair, welds H1 through H10 (see FIG. 16) of the core shroud were to be structurally replaced by a set of four stabilizer assemblies.

FIG. 15 shows one stabilizer assembly. Each stabilizer attaches to the top of the shroud and to a shroud support gusset 58 at the bottom. Radially acting stabilizers are used to maintain the alignment of the core shroud to the reactor pressure vessel (RPV) during seismic loading. The set of stabilizers replace the structural functions of the shroud welds, which were postulated to contain cracks. Each stabilizer assembly consists of a tie rod 54, an upper spring 72, a lower spring 56, an upper bracket 62, two mid-span tie rod supports 96a and 96b, and other minor parts, as previously described except that the repair apparatus shown in FIG. 2 had only one mid-span tie rod support. The tie rod 54 provides the vertical load carrying capability from the upper bracket 62 to the RPV gusset attachment as well as providing vertical positioning for the radial springs.

The tie rod and restraint springs are installed with relatively low mechanical loads, assuring they are held tightly in place and do not vibrate. The absence of gaps also assures applicability of linear seismic analysis, consistent with the Final Safety Analysis Report design basis. The tie rod thermal load is applied at operating temperature, due to differential thermal expansion of the core shroud and the vertical restraint system (also referred to herein as "the anchoring assembly") when the reactor changes from a shutdown state to a fully operative state in which nuclear heat is generated. The differential thermal expansion occurs because the vertical restraint apparatus is made of material (e.g., Ni—Cr—Fe alloy Inconel X-750 and XM-19 stainless steel) having a coefficient of thermal expansion which is less than a coefficient of thermal expansion of the shroud material (e.g., Type 304 stainless steel). This gives an operating load sufficient to prevent cracked shroud joints from separating, without inducing significant bending stress at the shroud discontinuity locations.

The vertical locations of the radial springs are chosen to provide positive positioning for all segments of the shroud and the fuel assemblies, assuming that the shroud contained cracks. The upper spring 72 provides radial load carrying capability from the shroud, at the elevation of the top guide support ring 118c, to the RPV. The upper bracket 62 provides an attachment feature for the assembly to the shroud flange 118a as well as providing restraint for the upper shroud welds. The upper mid-span tie rod support 96a provides a limit stop for the shroud cylinder 118e between welds H4 and H5 as well as provides a support for the tie rod 54 which increases the vibrational frequencies of the tie rod above the shroud annulus excitation range.

The lower spring provides radial restraint between the shroud, at the core support plate elevation, and the RPV. Its design incorporates an axial connecting member which is offset from the tie rod load path, such that it absorbs axial load by bending flexure. This arrangement provides axial compliance which can be adjusted to minimize both thermal transient loads and the component of the shroud seismic moment which is reacted in the tie rods. It is also used in combination with adjustment of the lateral restraint stiffnesses to allow tuning of the reactor dynamic response to minimize seismic loads. These features result in a design which provides positioning of the shroud for normal and accident conditions, while minimizing the required installation of repair hardware to four assemblies.

Figure 16:
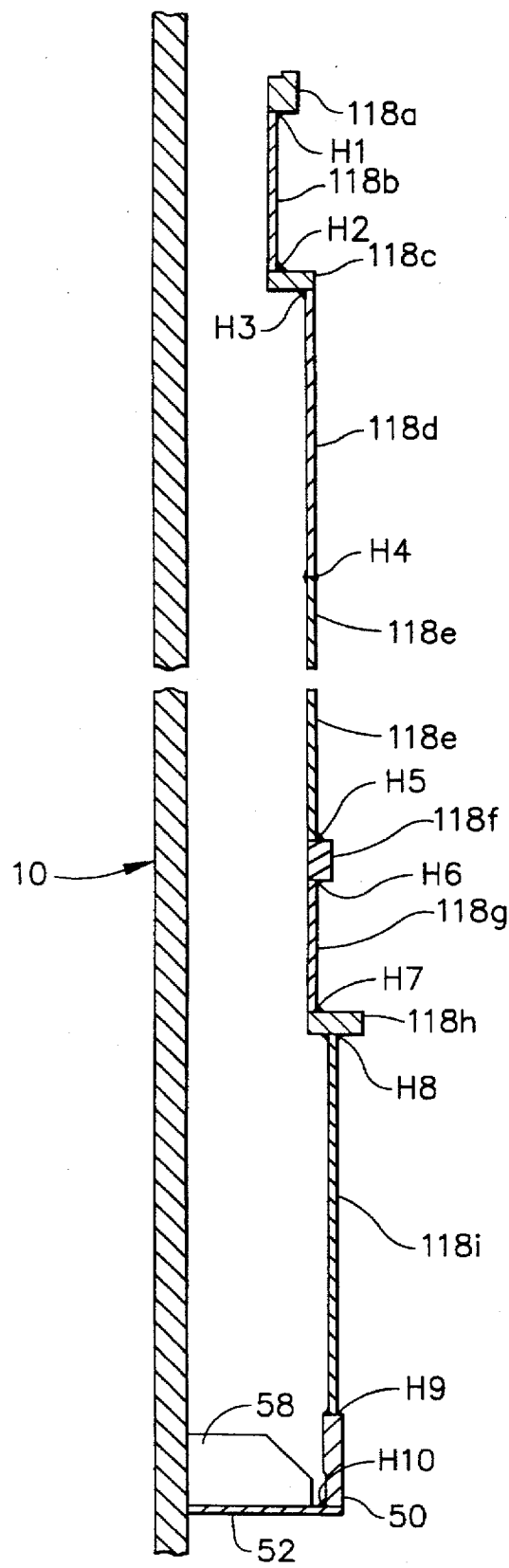
FIG. 16 is a sectional elevation view of a welded shroud assembly which is susceptible to stress corrosion cracking in its girth welds.

There are 10 horizontal welds in the shroud design shown in FIG. 16. These welds are titled H1–H10, with the welds at the core support elevation titled H7 and H8. H1 is the uppermost weld and H10 is the attachment weld of the shroud support cylinder 50 to the shroud support plate 52. Each cylindrical section of the shroud is prevented from unacceptable motion by the stabilizers even if it is assumed that its respective welds contain 360° through wall cracks. The motion of shroud flange 118a, cylindrical shell section 118b and top guide support ring 118c is restrained by the upper bracket 62. The upper bracket 62 contacts the shroud and is radially restrained by the upper spring 72 which contacts the RPV. There is also a feature on the upper bracket 62 which prevents unacceptable motion of the cylindrical shell section 118d. The cylindrical shell section 118e between welds H4 and H5 is prevented from unacceptable motion by a limit stop which is part of the upper mid-span tie rod support 96a. The section 118f between welds H5 and H6 is prevented from unacceptable motion by a limit stop which is incorporated into the lower mid-span tie rod support 96b. The lower spring 56 contacts the shroud such that it prevents unacceptable motion of the cylindrical shell section 118g between welds H6 and H7 as well as of the core support ring 118h. There is also an extension 56f on the lower spring 56 which prevents unacceptable motion of the cylindrical shell section 118i between welds H8 and H9. The shroud support cylinder 50 is prevented from unacceptable motion by the shroud support gussets 58, which were supplied as part of the RPV. The shroud support cylinder 50 is made of Inconel Alloy 600; the shroud (parts 118a–118i) is made of Type 304 stainless steel.

The significant forces applied to the stabilizers are from seismic events, loss-of-coolant accidents (LOCAs) and thermal expansion. The stabilizer assemblies and potential cracks in the shroud change the seismic response of the reactor internals. Thus it is necessary to modify the seismic analysis of the reactor to include the cracks and the stabilizer assemblies. This dynamic analysis was performed in an iterative manner to determine the appropriate values of the spring constants of the upper and lower springs as well as the number of stabilizer assemblies. The final number of assemblies required was determined to be four. Each assembly has an upper spring and a lower spring with rate constants, for example, of 20,000 and 150,000 pounds per inch, respectively. Wedges between the core support plate and the shroud are also required at each stabilizer location to prevent motion of the core support plate relative to the shroud. The limit stop at the middle of the tie rod 54 not only limits motion of shell 118e between welds H4 and H5, but also increases the natural frequency of the rod to prevent unacceptable vibration from coolant flow excitations.

The stabilizers are fabricated entirely from Type 316 stainless steel, Type XM-19 stainless steel and Inconel Alloy X-750. No welding is required during fabrication or installation. This avoids weld residual stress and heat affected zones such as contribute to shroud cracking.

The upper and lower springs, tensioning nut, and upper bracket 62 are fabricated from Alloy X-750 (Ni—Cr—Fe) material that has been heat treated at 1975°±25° F. followed by air cooling and age hardening after machining to increase its strength. Alloy X-750 was chosen because its inherent high strength was required and because its coefficient of thermal expansion is less than that of the shroud material. Alloy X-750 is resistant to IGSCC at the stress levels the components will experience during operation. The spring latches, upper wishbone spring, tensioning nut, clevis pin, torsion arms and jack bolt are also made of Alloy X-750. The tie rods are fabricated from Type XM-19 stainless steel material with a carbon content less than 0.040%. The material was annealed at 1950°–2050° F. followed by air cooling to a temperature below 800° F. within 20 minutes of removal from the furnace. Other components are fabricated from Type 316 or 316L stainless steel with a carbon content less than 0.02%. The material was annealed at 1900°–2100° F. followed by quenching in circulating water to a temperature below 400° F., or an equivalent procedure. All stainless steel material was tested for evidence of sensitization, which could impair its corrosion resistance.

In accordance with the exemplary repair installation shown in FIG. 15, the stabilizers were installed with a small mechanical tensioning, which assures that all components are tight after installation and during cold shutdown. The mechanical tensioning provides approximately 25,303 pounds of axial load on each tie rod, which has a diameter of 3.5 inches. The upper bracket 62, upper spring 72 and lower spring 56 are fabricated from Inconel (Ni—Cr—Fe) alloy X-750. The tie rod 54 is fabricated from Type XM-19 stainless steel. Alloy X-750 has a coefficient of thermal expansion which is smaller than that of Type XM-19 stainless steel, both of these coefficients in turn being smaller than the coefficient of thermal expansion of the shroud material, i.e., Type 304 stainless steel. Thus, the stabilizer assemblies are thermally loaded when the reactor is at operating conditions. The spring constant of the stabilizers in the vertical direction was designed, along with the differential thermal expansion, to provide a total vertical load at operating conditions which is greater than the net upward applied loads on the shroud during normal operation. Thus, if a subset or all of welds H1 through H10 were completely cracked, the stabilizers will vertically restrain the shroud such that no joint separation occurs during normal operation, which minimizes potential leakage through the cracks.

The upper and lower springs are installed with a small radial preload so that they are not loose or free to vibrate during operation. During normal operation, the shroud and springs expand radially due to thermal growth slightly greater than that of the RPV due to both thermal and pressure, which slightly increases the radial preload of the springs. Intimate contact with the shroud and vessel assures that the springs provide linear support for the shroud during seismic loading.

The vertical locations of the upper and lower springs were chosen to provide the maximum horizontal support for the fuel assemblies assuming that the shroud contained cracks. The upper springs are at the top guide elevation and the lower springs are at the core support plate elevation. All of the horizontal support for the fuel assemblies is provided by the top guide and the core support plate.

The stabilizer assemblies are designed and fabricated as safety related components. The installation of the stabilizer assemblies structurally replaces the functions of welds H1 through H10.

At the top of the shroud, each stabilizer assembly fits through a slot which is machined through the shroud head and steam separator assembly. The stabilizer upper bracket 62 contacts the top surface and the inside surface of the shroud flange 118a. It then extends downward to below weld H3. The upper bracket 62 supports the upper spring 72 and has a hole through which the tie rod 54 passes. The tie rod 54 is held against the upper bracket 62 with a nut 70. The tie rod extends downward approximately 165 inches to the lower spring. At the middle of the tie rod 54 there is an upper mid-span tie rod support 96a between the tie rod and the RPV. The support is installed such that there is a force between the tie rod and the RPV. The support serves two functions. The first function is to provide a support for the tie rod 54, to minimize the potential for vibration, and the second function is to provide a limit to the potential motion of the shroud shell section 118e between welds H4 and H5. At the elevation corresponding to the shroud section 118f between welds H5 and H6, there is a lower mid-span tie rod support which is included principally to provide a limit to the potential motion of that section of the shroud, but this tie rod support also provides a small lateral preload to the tie rod 54. At the bottom, the tie rod threads into the lower spring 56. The lower spring 56 has a clevis at its bottom, which is attached to the shroud support gusset with a pin 60. The pin 60 passes through a 3-inch hole which is machined in shroud support gusset 58.

All parts of the stabilizer assemblies are locked in place with mechanical devices. Loose parts cannot occur without the failure of a locking device. The stresses in most of the stabilizer components during normal plant operation are less than one third of the normal event allowable stresses. The stabilizers are fabricated from stress corrosion-resistant material, with no welding. Therefore, it is unlikely that a stabilizer component will fail. The fast neutron flux levels at the stabilizers are low compared to the values which could degrade material properties. Even after 20 years of operation, the maximum fast neutron fluence at the stabilizers will be well below the value to cause damage to stainless steel.

For the specific repair made to the shroud depicted in FIG. 16, the tie rod assembly was installed with a mechanical tension $F_{MECH}$ of 25,303 lb. during reactor shutdown. When the reactor was restarted, nuclear heat was generated which caused the tie rod assembly and the shroud to undergo differential thermal expansion, i.e., the shroud expanded more than the tie rod assembly. The amount of thermal load produced by this differential thermal expansion was calculated by thermal stress analysis in accordance with the following scheme, assuming that the shroud is at 534° F. and the tie rod assembly is at 522° F. during normal operation and that both are at 70° F. during reactor shutdown.

Account must also be taken of the thermal expansion of the gusset to which the bottom of the tie rod assembly is attached.

For the repair shown in FIG. 15, the thermal expansion $\Delta L_1$ for the upper support bracket was:

$$\Delta L_1 = L_1 \times \alpha_{X\text{-}750} \times \Delta T_1 \tag{1}$$

where $L_1$=42.35 inches is the length of the upper support bracket; $\alpha_{X\text{-}750}$=7.50×10$^{-6}$ inch/inch/°F. is the coefficient of thermal expansion for Alloy X-750; $\Delta T_1$=(522° F.−70° F.)= 452° F. is the increase in temperature in the downcomer annulus from reactor shutdown to reactor operation. Inserting these values into Eq. (1) yields a thermal expansion $\Delta L_1$=0.1436 inch.

The thermal expansion $\Delta L_2$ for the tie rod was:

$$\Delta L_2 = L_2 \times \alpha_{XM\text{-}19} \times \Delta T_1 \tag{2}$$

where $L_2$=159.75 inches is the length of the tie rod; $\alpha_{XM\text{-}19}$=8.9464×10$^{-6}$ inch/inch/°F. is the coefficient of thermal expansion for Type XM-19 stainless steel; $\Delta T_1$=452° F. Inserting these values into Eq. (2) yields a thermal expansion $\Delta L_2$=0.6462 inch.

The thermal expansion $\Delta L_3$ for the lower spring was:

$$\Delta L_3 = L_3 \times \alpha_{X\text{-}750} \times \Delta T_1 \tag{3}$$

where $L_3$=65.5 inches is the length of the lower spring; $\alpha_{X\text{-}750}$=7.50×10$^{-6}$ inch/inch/°F. is the coefficient of thermal expansion for Alloy X-750; $\Delta T_1$=452° F. Inserting these values into Eq. (3) yields a thermal expansion $\Delta L_3$=0.2221 inch.

The thermal expansion $\Delta L_G$ for the gusset was:

$$\Delta L_G = L_G \times \alpha_{600} \times \Delta T_1 \tag{3a}$$

where $L_G$=9.5 inches is the length of the gusset; $\alpha_{600}$= 7.7308×10$^{-6}$ inch/inch/°F. is the coefficient of thermal expansion for INCO 600; $\Delta T_1$=452° F. Inserting these values into Eq. (3a) yields a thermal expansion $\Delta L_G$=0.0332 inch.

The total thermal expansion $\Delta L_{TIEROD}$ for the tie rod assembly was:

$$\begin{aligned}\Delta L_{TIE\,ROD} &= \Delta L_1 + \Delta L_2 + \Delta L_3 + \Delta L_G \\ &= 0.1436 + 0.6462 + 0.2221 + 0.0332 \\ &= 1.0451 \text{ inches.}\end{aligned} \tag{4}$$

The total thermal expansion $\Delta L_{SHROUD}$ for the shroud assembly was calculated in an analogous manner:

$$\Delta L_4 = L_4 \times \alpha_{304SS} \times \Delta T_2 \tag{5}$$

where $L_4$=261.063 inches is the length of the shroud; $\alpha_{304SS}$=9.4244×10$^{-6}$ inch/inch/°F. is the coefficient of thermal expansion for Type 304 stainless steel; $\Delta T_2$=(534−70) =464° F. is the increase in temperature of the shroud from reactor shutdown to reactor operation. Plugging these values into Eq. (5) yields a thermal expansion $\Delta L_4$=1.1416 inches.

The thermal expansion $\Delta L_5$ for the shroud support cylinder 50, which is made of Inconel 600, was:

$$\Delta L_5 = L_5 \times \alpha_{600} \times \Delta T_1 \tag{6}$$

where $L_5$=16.0 inches is the length of the Inconel 600 portion; $\alpha_{600}$=7.7308×10$^{-6}$ inch/inch/°F. is the coefficient of thermal expansion for Inconel Alloy 600; $\Delta T_1$=(522° F.−70° F.)=452° F. is the increase in temperature of the Inconel 600 portion from reactor shutdown to reactor operation. Plugging these values into Eq. (6) yields a thermal expansion $\Delta L_5$=0.0559 inch.

The total thermal expansion $\Delta L_{SHROUD}$ for the shroud assembly was:

$$\Delta L_{SHROUD} = \Delta L_4 + \Delta L_5 + \qquad (7)$$
$$= 0.1416 + 0.0559$$
$$= 1.1975 \text{ inches.}$$

Thus, the net differential thermal expansion $\Delta L_{NET}$ for the shroud repair was:

$$\Delta L_{NET} = \Delta L_{SHROUD} - \Delta L_{TIE\,ROD} \qquad (8)$$
$$= 0.1975 - 1.0451$$
$$= 0.1524 \text{ inch.}$$

The stiffness $k_{TIE\,ROD}$ of the tie rod assembly was 505,300 lb./inch for a single tie rod. Thus, the thermal load $F_{THERMAL}$ on the tie rod, assuming that the shroud is rigid vertically, was:

$$F_{THER} = k_{TIE\,ROD} \times \Delta L_{NET} \qquad (9)$$
$$= 505,300 \times 0.1524$$
$$= 77,008 \text{ lb.}$$

Due to reduction of elastic modulus at operating temperature, the mechanical tension is reduced from 25,303 to 23,793 pounds. With a mechanical tension of 23,793 lb., the summed load $F_{SUM}$ on each tie rod is:

$$F_{SUM} = F_{MECH} + F_{THER} \qquad (10)$$
$$= 23,793 + 77.008$$
$$= 100,801 \text{ lb.}$$

which load produces a tensile stress in the tie rod of 11,504 psi, which is substantially less than the allowable tensile stress in the tie rod of 29,678 psi. Similar calculations must be performed for other thermal conditions such as the thermal upset loading (Upset 1) produced during so-called "cold feedwater injection transients". For example, in the event of a loss of the feedwater pumps, low-temperature condensate storage water is injected into the reactor. The injection of cold water produces a larger temperature differential between the shroud and the tie rod assembly, e.g., 431° F. vs. 300° F. This produces a correspondingly larger differential thermal expansion of 0.3948 inch. The resulting thermal load on the tie rod is 199,493 lb. This thermal load plus the mechanical tensioning (23,793 lb.) produces a tensile stress in the tie rod of 25,483 psi, which is less than the allowable stress at 300° F., i.e., the tie rod material will not yield to cause a loss of thermal loading. Hence the tie rod meets the design specification requirements for both normal and upset conditions.

The above calculations assume a shroud which is rigid in the vertical direction, which assumption is appropriate for stress calculations. In addition, the potential loss of thermal load due to loss of shroud stiffness caused by weld cracks must be evaluated. Cracks in welds H2 and H3 are the most significant for loss of thermal load. The thermal load during normal operation for a shroud with the limiting combination of cracked welds should be designed to provide a net downward load on the shroud.

A seismic analysis of the nuclear power station having the shroud design shown in FIG. 16 was performed to obtain shroud repair design loads. These loads were used for the new spring hardware design as well as to validate the integrity of the reactor vessel internal structures and to ensure emergency shutdown. Analyses were completed for a range of postulated shroud weld cracks as well as for a fully uncracked configuration with shroud restraint hardware installed.

The first step in the seismic load evaluation process is the development of the horizontal, lumped mass beam seismic model. This includes the reactor and internals model and the building and balance of plant model generally supplied by the customer. This can be used to determine the modal frequencies and benchmark them by comparing with prior analysis. The next step is to input the appropriate seismic time histories for the East/West and North/South directions for both the OBE and SSE events. In most cases the seismic input is in the form of a response spectrum, so synthetic time histories have to be developed from the response spectrum. It is also necessary to verify the adequacy of the synthetic time history by comparing its response spectrum with the desired original response spectrum. Analysis is performed for several crack combinations, including the original uncracked case. Where no a hinge is assumed. Where there is separation, for example for a faulted event, rollers may be assumed. The stabilizer hardware itself is modeled using rotational and translational springs. The number of cases analyzed depends on parametric studies or experience with other plants. Once the limiting cases are selected, several iterations may be necessary before the right combination of stiffnesses for the stabilizer springs are selected, based on optimizing the loads to a point where the stress limits are likely to be met. At this point, steps must be taken to ensure that the final design not only meets stress limits, but is installable. Also, usability of existing installation tools is an extremely important objective since tooling costs are far higher than analysis/engineering costs. Thus, iterations may be needed at this point also. Final seismic reports are issued after the design is final and it is confirmed that the stress limits as defined in the design specifications are met.

The seismic mathematical model for analysis was regenerated based on the information provided in an existing seismic analysis report for the plant being repaired. With the exception of the spring hardware for the repair and the provisions for crack modeling, the new model used was identical to the original model. Two models were created for each of the East-West and North-South directions. One model assumed full load carrying capability of the concrete in the biological shield wall and the other model assumed zero load carrying capability of the concrete. In order to benchmark the new analytical results against those previously reported, the mode and frequency analysis with an integral uncracked shroud without the shroud repair was carried out for the East-West model with no concrete load capability in the shield wall. Good agreement in the eigenvalue data set was achieved.

Transient response time history analysis, based on modal superposition, was applied for the analyses. Structural responses, from the seismic motions of the Housner and the 1952 Taft earthquake in the form of acceleration time histories, were calculated for both the Operational Basis Earthquake (OBE) and the Safe Shutdown Earthquake (SSE).

The seismic model was constructed with beam and spring elements. Beam elements were used for modeling the reactor building, shield wall, pedestal, RPV and internals, while the springs were used to model structures such as floors, structural supports and the foundation. The stiffnesses of these springs was predetermined. Mass points were located between massless beam elements in every structural branch of the model, and all the branches were on a single centerline in the model. Only the horizontal translational and rotational degrees of freedom corresponding to a single plane were included and all other degrees of freedom were deleted.

Four basic models were constructed: one model with load carrying capability of the concrete in the shield wall and another without were constructed for each of the East-West and North-South orientations. The shroud restraint hardware was modeled as linear translational and rotational springs and additional dual node points were used to simulate the cracked weld joints.

The spring rates for the stabilizer supports and tie rods were included in the analysis. Four radial springs were used at both the top guide and the core support plate levels. Each radial spring can only take compressive load. The spring constant for the tie rods was calculated based on the four tie rods rotating about the shroud neutral axis.

An enveloping combination of cracked/uncracked welds was analyzed to define the worst case combination for the core plate and top guide displacements. The stabilizer design was based on the worst case scenario to ensure control rod insertion and safe shutdown, should this postulated scenario occur. Each cracked weld was postulated to have a 360° through wall crack. It was concluded that four cracked cases bound the numerous possible combinations of assumed cracked welds while considering the various plant operating conditions, and yielding the maximum spring loads for the shroud repair hardware. The four bounding cases are:

All welds cracked—all welds modeled as hinges.

All welds cracked—weld H1 modeled as a roller, welds H2 through H10 modeled as hinges.

Weld H10 cracked—weld H10 modeled as a hinge.

Weld H10 cracked—weld H10 modeled as a roller.

A total of 16 model analyses were performed for each of two time history inputs. The input resulting in the greatest response was used for design. OBE and SSE analyses were performed independently due to the various element damping factors applied and different allowable stresses in each analysis. The loading and deflections considered for the repair design bounded the results of these 16 cases.

The maximum deflection of any part of the shroud that is not directly supported by either the upper or lower radial springs was limited to approximately 0.75 inch by mechanical limit stops. These stops do not perform any function unless a section of the shroud, for example, shell section 118e between welds H4 and H5 (see FIG. 16), becomes loose and a combined LOCA plus seismic event occurs. If this unlikely scenario occurs, the stops will limit the horizontal displacement to approximately 0.75 inch, which is equal to one half of the shroud wall thickness. These stops do not invalidate the linear seismic analysis because very little mass is associated with any potential loose and unsupported section of the shroud. A displacement equal to one half of the shroud wall thickness will not result in post-event leakage that prevents core cooling because the shroud sections still overlap each other by one half (0.75 inch) of the shroud wall thickness.

In order to ensure that the installation of the stabilizer design does not adversely affect the existing dynamic qualification of the RPV and internals, assuming no defective welds are present, analyses for the uncracked case were performed with and without the shroud repair in place. It was concluded that seismic loads in the RPV and internal structures are decreased, or at least not significantly increased, by the shroud stabilizer installation. It was also shown that loads in the RPV and internals are further reduced by the inclusion of the most limiting combination of assumed cracks. This is because as the shroud rigidity decreases, the fuel is isolated and the seismic load is mainly carried by the stabilizer springs and the tie rods.

Evaluation of normal operating loads as well as OBE, SSE, and main steam line and recirculation line LOCAs is required to satisfy reactor safety standards. The following load combinations were considered:

Normal: Weight, normal operating pressure differences and temperatures

Upset 1: Limiting thermal condition, caused by a scram with loss of feedwater pumps (i.e., cold feedwater injection transient) plus normal operating weight and pressure differences Upset 2: Weight, normal operating pressures and temperatures plus OBE Emergency 1: Weight plus normal operating pressures plus SSE Emergency 2: Weight plus main steam line LOCA Emergency 3: Weight plus recirculation line LOCA Faulted 1: Weight plus SSE plus main steam line LOCA Faulted 2: Weight plus SSE plus recirculation line LOCA The values of the individual loads were obtained from the design specifications and the seismic report, which include the seismic analysis results of the shroud with postulated horizontal weld cracks and with the stabilizer assemblies installed.

Each of the horizontal weld cracks were modeled as either a hinge or a roller. The seismic results for the roller cases were used for the stress analysis only when it was found that the total load (equal to the sum of the mechanical tensioning and the thermal load) was exceeded on all four tie rods simultaneously. If the pressure uplift and/or seismic loads used in the computer simulation result in a tensile load applied to each tie rod that exceeds the sum of the mechanical tensioning and the thermal load, then the compressive load on the shroud is relieved. When the applied uplift and seismic tie rod load are less than the sum of the mechanical tensioning and the thermal load, the jagged IGSCC crack transmits shear. Shear transfer is the definition of the hinge condition.

The cracked weld hinge condition was found to be justified for all cases except for the main steam line LOCA only case (Emergency 2). For example, the net upward load in the event of a Faulted 1 condition was 84,300 lb., which is less than the operating load on the tie rod of 100,801 lb. For the Emergency 1 and Upset 2 conditions, the net load is downward, so the operating load on the tie rod is not exceeded in either case. The uplift forces from a main steam line LOCA applied by itself (Emergency 2) exceed the load on all four tie rods such that there is no resultant compressive load on the shroud for this event. When these same LOCA loads are combined with the seismic SSE, the horizontal seismic moment causes a portion of the circumferential shroud crack to remain under compressive load at all times, hence the hinge model is used. Use of the roller assumption for such cases would overestimate the load carried by the stabilizer springs and may underestimate the shroud stresses.

In general, the limiting loads in the tie rods occur with assumed shroud cracks which are different than the shroud cracks assumed to produce the limiting radial loads in the upper and lower springs. The limiting loads in the tie rods occur when it is assumed that there is a 360° throughwall crack in weld H10 and that crack behaves as a hinge (shear transfer but no moment transfer). If the crack is assumed to behave as a roller (no shear and no moment transfer), then the loads are reduced in the tie rods. The limiting loads in the radial direction on both the upper and lower springs occur for the all-welds-cracked case; these cracks behave as hinges.

In addition, an evaluation of the effects of shroud stiffness on tie rod load was made. It was determined that the lowest tie rod thermal load occurs when the tie rods are installed on the uncracked shroud and subsequently shroud welds, including welds H2, H3 and H7, crack. The lowest resulting tie rod load was still found to provide a net compression on the shroud during normal operation.

The foregoing analysis of the thermal load applied by the present invention has been given with reference to the installation of shroud repair hardware at a specific BWR. It should be appreciated that the required tie rod thermal load will vary in nuclear power plants of different construction.

In accordance with the preferred arrangement, four shroud restraint tie rod assemblies are installed at respective azimuthal positions distributed at angular intervals around the shroud circumference. However, the concept of the invention is directed to the installation of three or more tie rod assemblies and is expressly not limited to an arrangement of four.

The preferred embodiment of the shroud restraint assembly in accordance with the invention has been disclosed for the purpose of illustration. Variations and modifications of the disclosed structure which fall within the concept of this invention will be readily apparent to persons skilled in the art. All such variations and modifications are intended to be encompassed by the claims set forth hereinafter.

We claim:

1. A boiling water reactor, comprising:
   a reactor pressure vessel;
   a core shroud;
   a shroud support structure arranged to support said core shroud inside said reactor pressure so that said core shroud and said reactor pressure vessel define a downcomer annulus therebetween;
   an assembly arranged in said downcomer annulus for anchoring an upper portion of said core shroud relative to said shroud support structure;
   a first lateral restraint for resisting lateral deflection of said core shroud relative to said reactor pressure vessel at a first height above said shroud support structure, said first lateral restraint being supported by said anchoring assembly; and
   a second lateral restraint for resisting lateral deflection of said core shroud relative to said reactor pressure vessel at a second height above said shroud support structure, said second height being less than said first height, and said second lateral restraint being supported by said anchoring assembly,
   wherein said anchoring assembly is made of material having a coefficient of thermal expansion which is less than a coefficient of thermal expansion of the material which said core shroud is made of, and said anchoring assembly undergoes a thermal expansion which is less than the thermal expansion of said core shroud when the reactor changes from a shutdown state to a fully operative state in which nuclear heat is generated, the differential thermal expansion of said anchoring assembly and said core shroud producing a thermal load at operating conditions which is greater than the net upward applied loads on said core shroud during normal operation, and said anchoring assembly has a mechanical tension which is less than the net upward applied loads on said core shroud during normal operation.

2. The boiling water reactor as defined in claim 1, wherein said anchoring assembly comprises a tie rod having first and second ends, an upper support for coupling said first end of said tie rod to the upper portion of said core shroud and a lower support for coupling said second end of said tie rod to said shroud support structure.

3. The boiling water reactor as defined in claim 2, wherein said tie rod is made of a first material having a first coefficient of thermal expansion which is less than the coefficient of thermal expansion of the shroud material.

4. The boiling water reactor as defined in claim 3, wherein said upper support is made of a second material having a second coefficient of thermal expansion which is less than said first coefficient of thermal expansion.

5. The boiling water reactor as defined in claim 3, wherein said lower support is made of a second material having a second coefficient of thermal expansion which is less than said first coefficient of thermal expansion.

6. The boiling water reactor as defined in claim 2, wherein said first lateral restraint comprises a first spring supported by said upper support.

7. The boiling water reactor as defined in claim 6, wherein said first spring is a double cantilever wishbone spring.

8. A boiling water reactor, comprising:
   a reactor pressure vessel;
   a core shroud;
   a shroud support structure arranged to support said core shroud inside said reactor pressure so that said core shroud and said reactor pressure vessel define a downcomer annulus therebetween;
   an assembly arranged in said downcomer annulus for anchoring an upper portion of said core shroud relative to said shroud support structure;
   a first lateral restraint for resisting lateral deflection of said core shroud relative to said reactor pressure vessel at a first height above said shroud support structure, said first lateral restraint being supported by said anchoring assembly; and
   a second lateral restraint for resisting lateral deflection of said core shroud relative to said reactor pressure vessel at a second height above said shroud support structure, said second height being less than said first height, and said second lateral restraint being supported by said anchoring assembly,
   wherein said anchoring assembly comprises a tie rod having first and second ends, an upper support for coupling said first end of said tie rod to the upper portion of said core shroud and a lower support for coupling said second end of said tie rod to said shroud support structure, and said first lateral restraint comprises a first spring supported by said upper support,
   further comprising sliding means for allowing said first spring to translate relative to said upper support between first and second positions and threaded means for transforming rotation of a tool into translation of said first spring along the path of travel between said first and second positions.

9. The boiling water reactor as defined in claim 8, wherein said sliding means are disposed at an oblique angle relative to a vertical axis of said upper support.

10. The boiling water reactor as defined in claim 8, wherein said upper support comprises a support block and said threaded means comprises a threaded hole formed in said support block and a jack bolt having a threaded shaft which threadably engages said threaded hole of said support block, further comprising means for coupling said jack bolt to said sliding means with only one degree of freedom such that said jack bolt is rotatable about its own axis.

11. The boiling water reactor as defined in claim 2, wherein said lower support comprises a first arm of a double cantilever wishbone spring and said second lateral restraint comprises said first arm and a second arm of said double cantilever wishbone spring.

12. The boiling water reactor as defined in claim 11, further comprising a contact spacer coupled to said tie rod and positioned to transmit the spring force of said double cantilever wishbone spring to said reactor pressure vessel.

13. A boiling water reactor, comprising:

a reactor pressure vessel;

a core shroud;

a shroud support structure arranged to support said core shroud inside said reactor pressure so that said core shroud and said reactor pressure vessel define a downcomer annulus therebetween;

means for anchoring an upper portion of said core shroud to said shroud support structure which connects a lower portion of said core shroud to said reactor pressure vessel; and spring means for resisting lateral deflection of said core shroud relative to said reactor pressure vessel at a first height above said shroud support structure, said spring means being supported by said anchoring means, wherein said anchoring means is made of material having a coefficient of thermal expansion which is less than a coefficient of thermal expansion of the material which said core shroud is made of, and said anchoring means undergoes a thermal expansion which is less than the thermal expansion of said core shroud when the reactor changes from a shutdown state to a fully operative state in which nuclear heat is generated, the differential thermal expansion of said anchoring assembly and said core shroud producing a thermal load at operating conditions which is greater than the net upward applied loads on said core shroud during normal operation, and said anchoring assembly has a mechanical tension which is less than the net upward applied loads on said core shroud during normal operation.

14. A boiling water reactor, comprising:

a reactor pressure vessel;

a core shroud;

a shroud support structure arranged to support said core shroud inside said reactor pressure so that said core shroud and said reactor pressure vessel define a downcomer annulus therebetween;

an assembly arranged in said downcomer annulus for anchoring an upper portion of said core shroud relative to said shroud support structure;

a first lateral restraint for resisting lateral deflection of said core shroud relative to said reactor pressure vessel at a first height above said shroud support structure, said first lateral restraint being supported by said anchoring assembly; and a second lateral restraint for resisting lateral deflection of said core shroud relative to said reactor pressure vessel at a second height above said shroud support structure, said second height being less than said first height, and said second lateral restraint being supported by said anchoring assembly, wherein said first lateral restraint comprises a first spring supported by said anchoring assembly.

15. The boiling water reactor as defined in claim 14, wherein said first spring is a double cantilever wishbone spring.

16. A boiling water reactor, comprising:

a reactor pressure vessel;

a core shroud;

a shroud support structure arranged to support said core shroud inside said reactor pressure so that said core shroud and said reactor pressure vessel define a downcomer annulus therebetween;

an assembly arranged in said downcomer annulus for anchoring an upper portion of said core shroud relative to said shroud support structure;

a first lateral restraint for resisting lateral deflection of said core shroud relative to said reactor pressure vessel at a first height above said shroud support structure, said first lateral restraint being supported by said anchoring assembly; and a second lateral restraint for resisting lateral deflection of said core shroud relative to said reactor pressure vessel at a second height above said shroud support structure, said second height being less than said first height, and said second lateral restraint being supported by said anchoring assembly, wherein said second lateral restraint comprises a first arm and a second arm of double cantilever wishbone spring.

* * * * *